INVENTOR.
HANS P. LUHN
BY William Lang
ATTORNEY

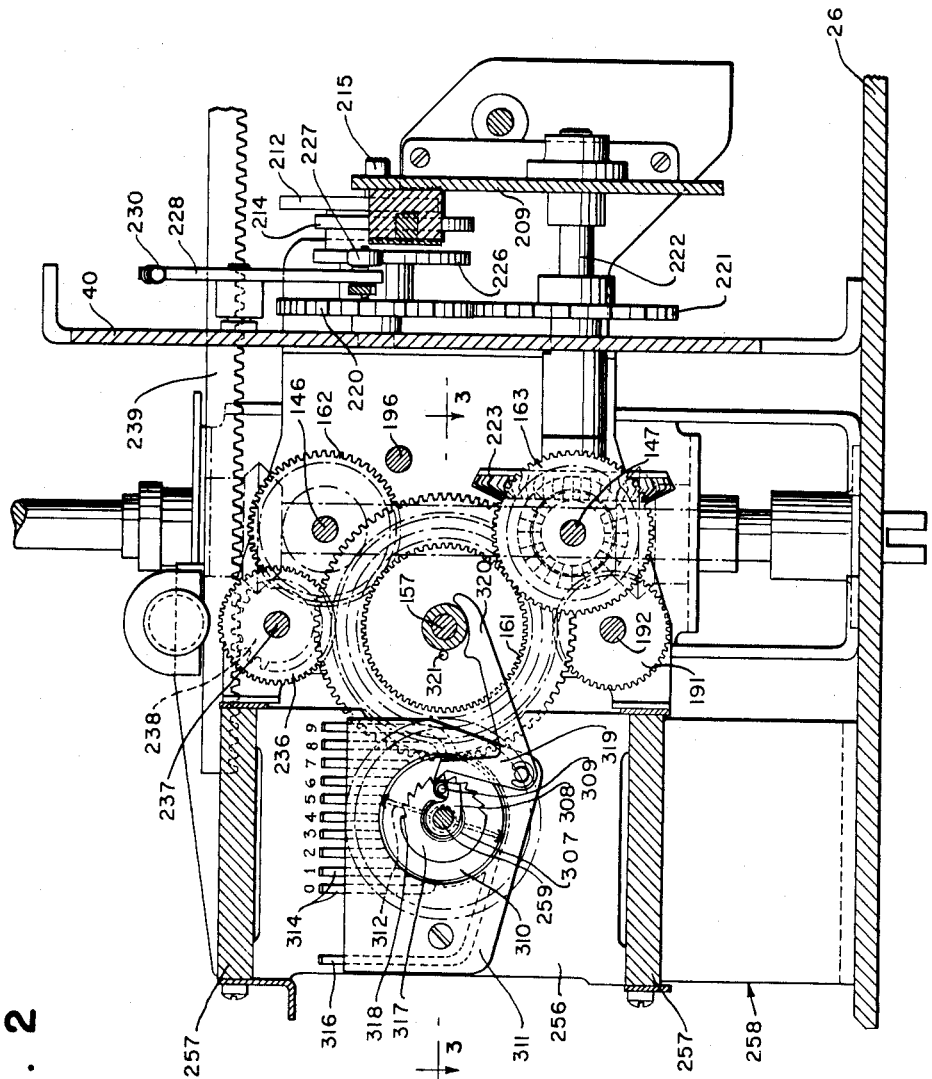

April 10, 1956     H. P. LUHN     2,741,430
DIFFERENTIAL CONTROL MECHANISMS
Filed Dec. 31, 1951     22 Sheets-Sheet 4

FIG. 3

*INVENTOR.*
HANS P. LUHN
BY
*William Lang*
ATTORNEY

April 10, 1956  H. P. LUHN  2,741,430
DIFFERENTIAL CONTROL MECHANISMS
Filed Dec. 31, 1951  22 Sheets-Sheet 5

INVENTOR.
HANS P. LUHN
BY
William Lang
ATTORNEY

INVENTOR.
HANS P. LUHN
BY
William Lang
ATTORNEY

April 10, 1956 H. P. LUHN 2,741,430
DIFFERENTIAL CONTROL MECHANISMS
Filed Dec. 31, 1951

INVENTOR.
HANS P. LUHN
BY
William Lang
ATTORNEY

INVENTOR.
HANS P. LUHN
BY
William Lang
ATTORNEY

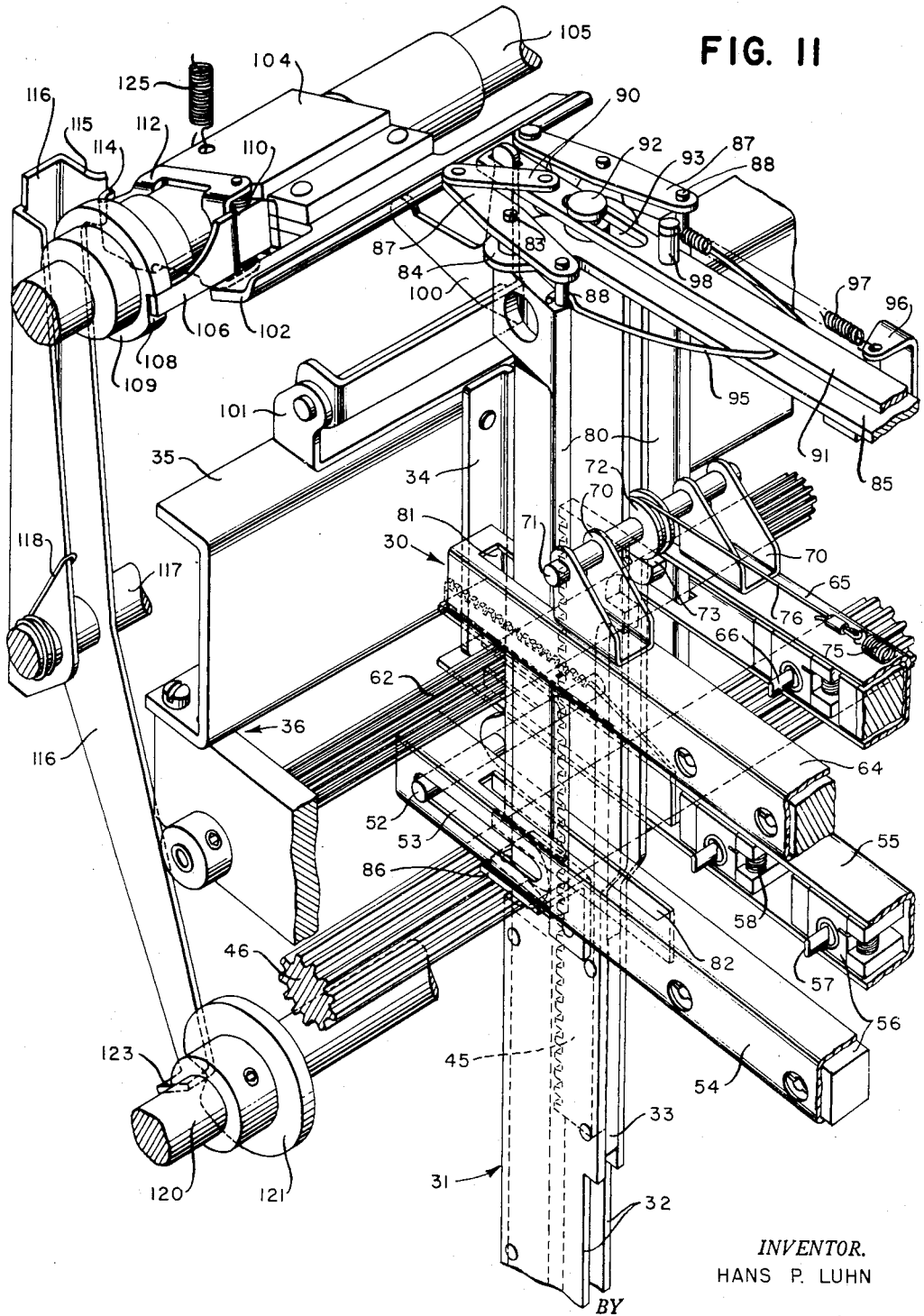

April 10, 1956 H. P. LUHN 2,741,430
DIFFERENTIAL CONTROL MECHANISMS
Filed Dec. 31, 1951 22 Sheets-Sheet 11

INVENTOR.
HANS P. LUHN
BY
William Lang
ATTORNEY

April 10, 1956 H. P. LUHN 2,741,430
DIFFERENTIAL CONTROL MECHANISMS
Filed Dec. 31, 1951 22 Sheets-Sheet 12

INVENTOR.
HANS P. LUHN
BY
*William Lang*
ATTORNEY

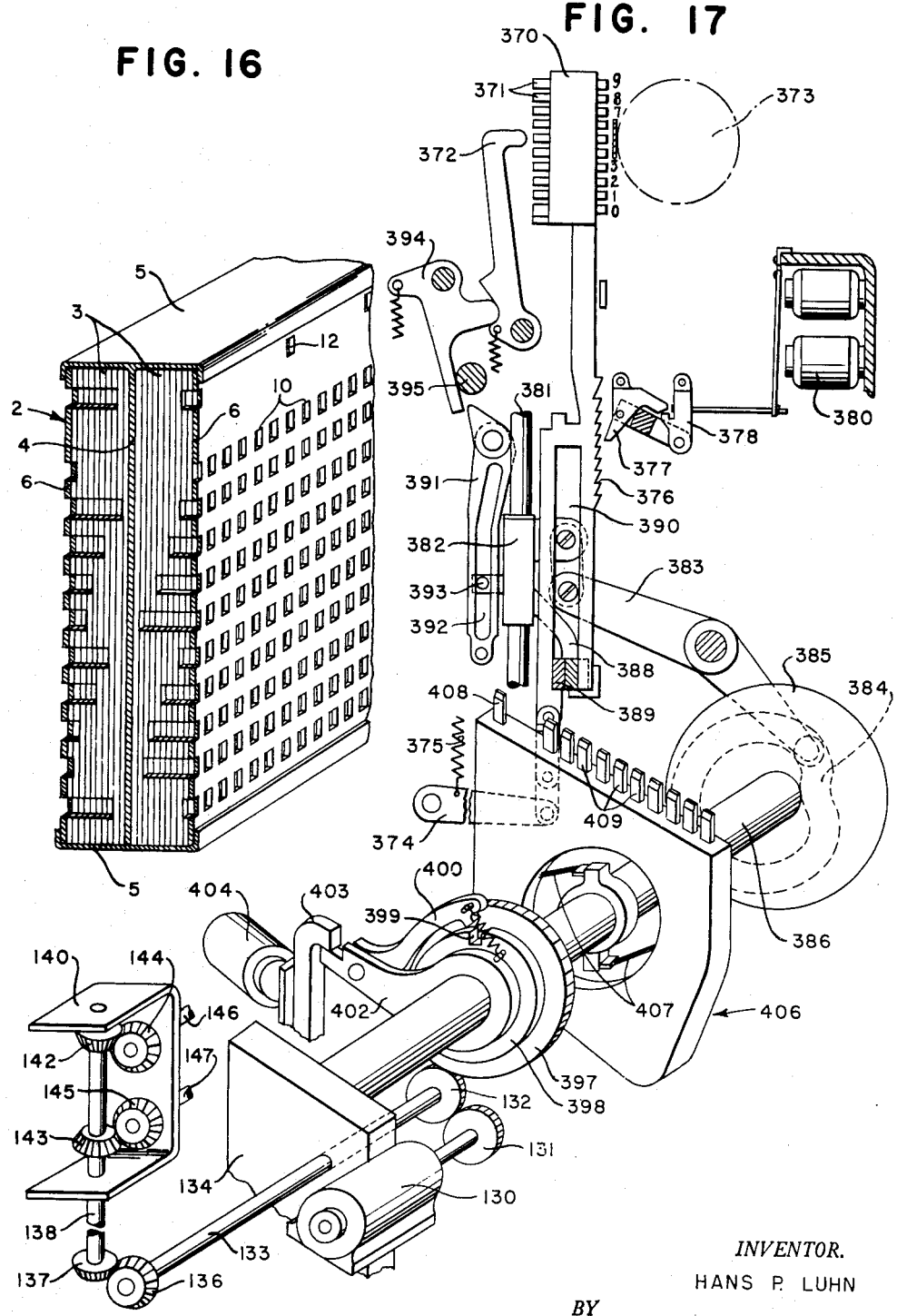

April 10, 1956  H. P. LUHN  2,741,430
DIFFERENTIAL CONTROL MECHANISMS
Filed Dec. 31, 1951  22 Sheets-Sheet 14

*INVENTOR.*
HANS P. LUHN
*William Lang*
ATTORNEY

INVENTOR.
HANS P. LUHN
BY
William Lang
ATTORNEY

April 10, 1956　　　H. P. LUHN　　　2,741,430
DIFFERENTIAL CONTROL MECHANISMS
Filed Dec. 31, 1951　　　22 Sheets-Sheet 17

INVENTOR.
HANS P. LUHN
BY
William Lang
ATTORNEY

April 10, 1956  H. P. LUHN  2,741,430
DIFFERENTIAL CONTROL MECHANISMS
Filed Dec. 31, 1951  22 Sheets-Sheet 18

INVENTOR.
HANS P. LUHN
BY
William Lang
ATTORNEY

H. P. LUHN 2,741,430

DIFFERENTIAL CONTROL MECHANISMS

Filed Dec. 31, 1951

*INVENTOR.*
HANS P. LUHN

BY

*William Lang*
ATTORNEY

INVENTOR.
HANS P. LUHN
BY
William Lang
ATTORNEY

United States Patent Office 2,741,430
Patented Apr. 10, 1956

2,741,430

DIFFERENTIAL CONTROL MECHANISMS

Hans P. Luhn, Armonk, N. Y., assignor to International Business Machines Corporation, New York, N. Y., a corporation of New York Application December 31, 1951, Serial No. 264,327

7 Claims. (Cl. 235—61.6)

This invention relates to table look-up devices, and more particularly to machines which operate automatically in response to electric pulses for reading out information corresponding to the pulses, from prepared records in a file.

In determining bills for the consumption of gas or electricity, or for the use of certain services, it is usually necessary to take into consideration the different rates that apply to different ranges of consumption as well as the location of the consumer. It is, therefore, not possible to obtain directly from a card which is prepared to represent the total consumption of a customer, an accounting operation which determines the amount owed. It is possible, however, to prepare record cards with designations at different points representing the amount owed for each possible total consumption, and to cause a machine to operate in response to a reading of a consumption card so as to effect a reading of the record cards at the points which indicate the amount owed.

A preferred form of the invention may include record cards arranged in packs which are supported in different compartments. There may be ten card packs in each compartment and ten compartments, both the card packs and the compartments being numbered 0 to 9. Each card pack may consist of ten cards, and each card may have index points arranged in ten horizontal rows and in vertical rows which are divided into fields having ten rows each. Formed upon one face of each card is a conducting material so that the card may form part of an electric circuit. Along the upper edges of the cards are perforations through which pulsing pins may be extended to make contact with the different cards. There are ten pulsing pins numbered 0 to 9, the 0 pin being engageable with the first or 0 card, the 1 pin extending through a perforation in the 0 card to engage the 1 card, the 2 pin extending through perforations in the 0 and 1 cards to engage the 2 card, etc. A group of reading pins, one for each field, are adapted to engage the different cards through perforations at the index points for passing pulses as they are delivered through the cards from the pulsing pins, to accumulators or printing devices. The reading pins are arranged to engage the cards at index points in corresponding vertical rows of different fields and are movable horizontally as a group so as to cooperate with any one of the vertical rows in their respective fields.

A set of pulsing pins and a set of reading pins are provided for each compartment and are mounted upon a reading device which is movable ten steps vertically on a carriage which, in turn, is movable ten steps horizontally relative to the compartments. When the carriage is in any one of 0 to 9 horizontal positions, it is located so that the reading devices may pick up the corresponding numbered card packs for reading. With the reading devices in any one of 0 to 9 vertical positions, the card packs supported thereby are arranged so that the reading pins are in line with the corresponding numbered horizontal rows of index points. The pulsing pins are adapted to engage the cards through the upper row of perforations when a reading device is in each of its vertical positions.

The different reading devices may be moved simultaneously in horizontal and vertical directions to position the corresponding numbered card packs in the compartments to the same positions for reading. The pulsing and reading pins, however, are normally free of the cards, and only one set of these pins may be operated at a time to effect a pulsing and reading of one pack of cards.

By providing separate means which operate from pulses received from the reading of a consumption card at four different points, it is possible to position the reading devices horizontally and vertically, to shift the reading pins horizontally, and to select the set of pins which are to pulse and read a card pack. The means operating from the reading of the consumption card at the thousands position may effect a shifting of the carriage horizontally to the corresponding numbered position. A reading of the card at the hundreds order position may cause the operation of means for effecting the actuation of the pulsing and reading pins on the reading device of the corresponding compartment. The means operating from the reading of the card at the tens and units positions may determine the vertical movement of the reading devices and the lateral shifting of the reading pins, respectively. For each unit change in the figure representing consumption, there is obtained a reading from a different set of points on the card packs. The number of points in each reading from a pack is determined by the number of fields at which readings may be taken. If there are more fields than are needed for reading out the amounts owed, then some of the reading pins may be connected for reading out the amounts owed under one set of charging rates and other pins in each set may be connected for reading out the amounts owed under another set of charging rates.

To increase the number of fields at which readings may be taken, each card pack may be made up of two groups of tens cards with the cards of one group having their conducting sides facing in one direction and the other group having their conducting sides facing in the opposite direction. Pulsing and reading pins would then be provided for each group of cards, and the pins of each group would be positioned and operated simultaneously.

An object of this invention is to provide a mechanism which is operable in response to combinations of electric pulses for reading from prepared records, data corresponding to the pulse combinations.

Another object is to provide a mechanism which operates according to instructions obtained from the sensing of a card for reading out corresponding information from filed records.

Still another object is to provide record cards constructed and arranged in an improved manner for the reading of information stored therein.

Another object is to provide an improved device in which information may be stored, and from which the information may be read any desired number of times.

Yet another object is to provide a mechanism having an operating member which is movable to different positions in response to the sensing of designations on a record, and including means for effecting movement of said member directly from one position to another without returning to a home position.

Another object is to provide an improved driving means for moving a member to different positions, and having associated therewith improved means for controlling the direction and distance of the moving of said member by driving means.

Other objects of the invention will be pointed out in the following description and claims and illustrated in the accompanying drawings, which disclose, by way of example, the principle of the invention and the best mode which has been contemplated, of applying that principle.

In the drawings:

Fig. 2 is an enlarged vertical sectional view taken on the plane of the line 2—2 of Fig. 1 and showing drive connections through one of several control units.

Fig. 3 is an enlarged sectional view taken on the line 3—3 of Fig. 2 and showing one of the control units with drive connections thereto.

Figure 4:
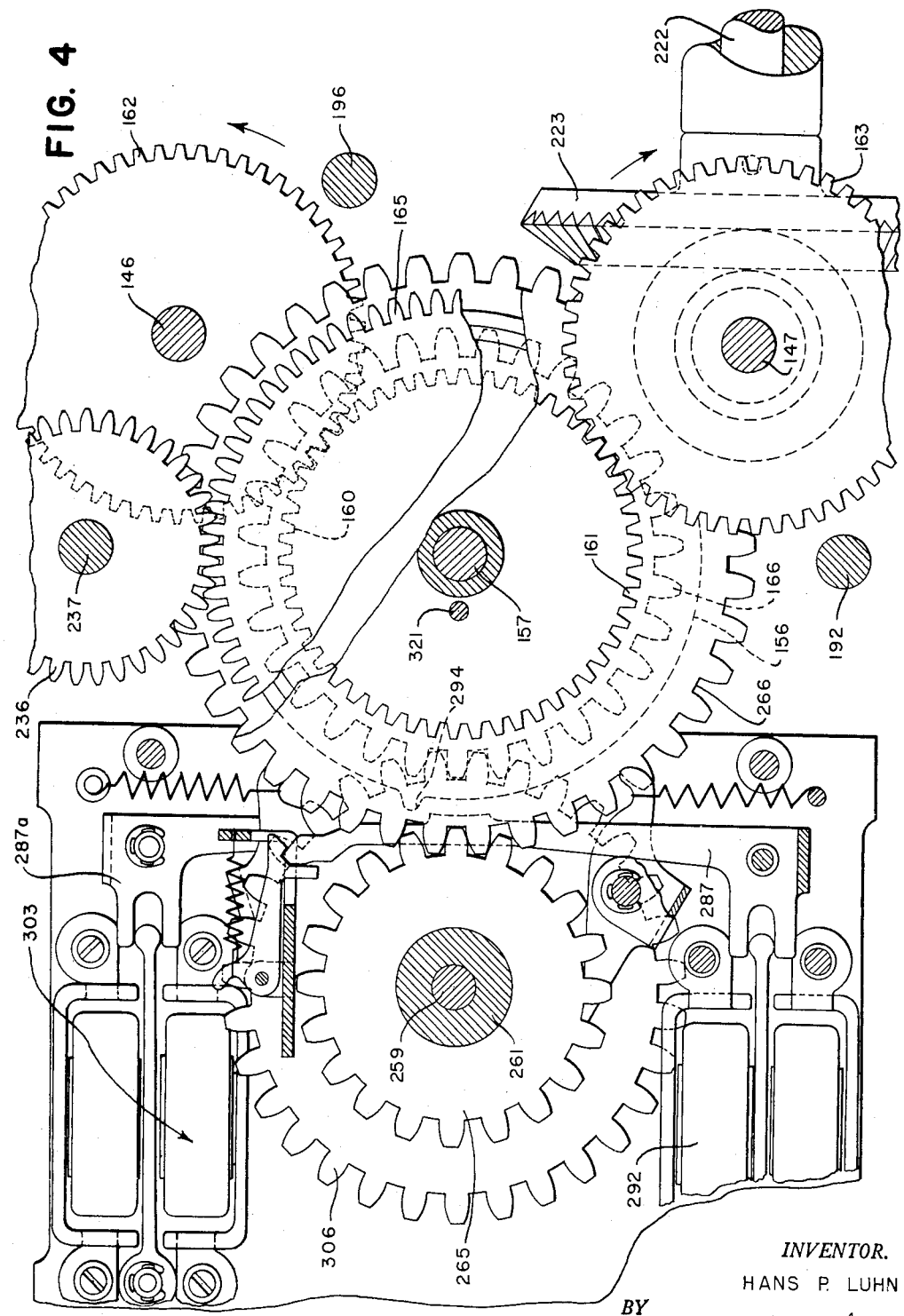
Figure 6:
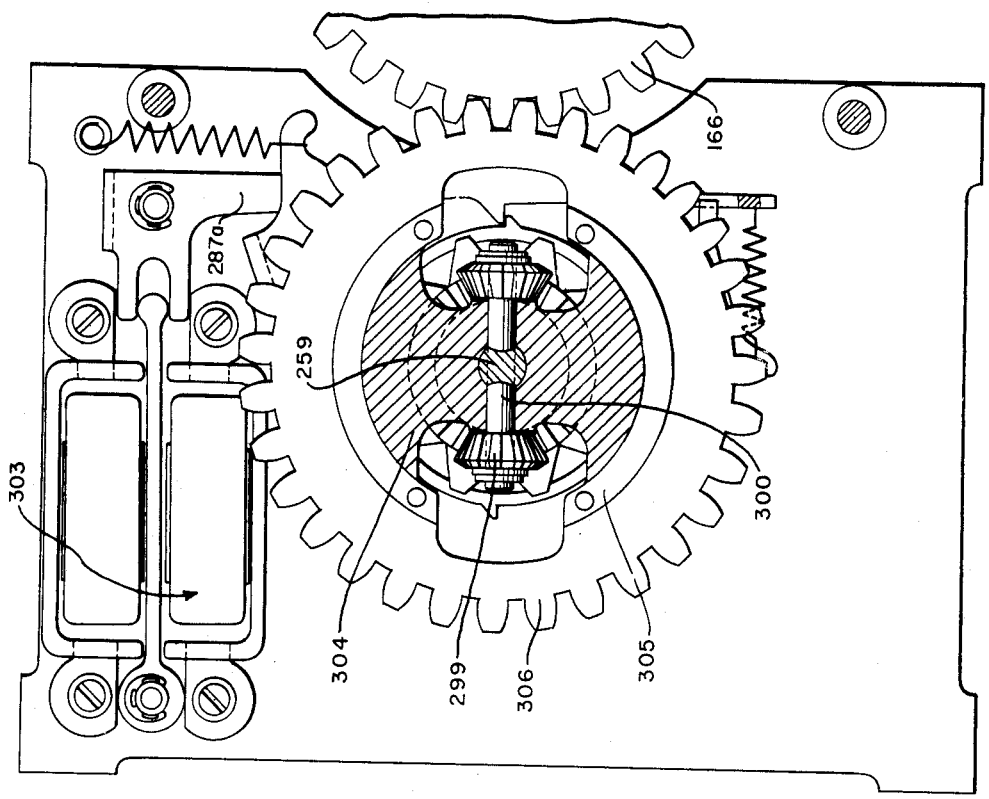
Figure 5:
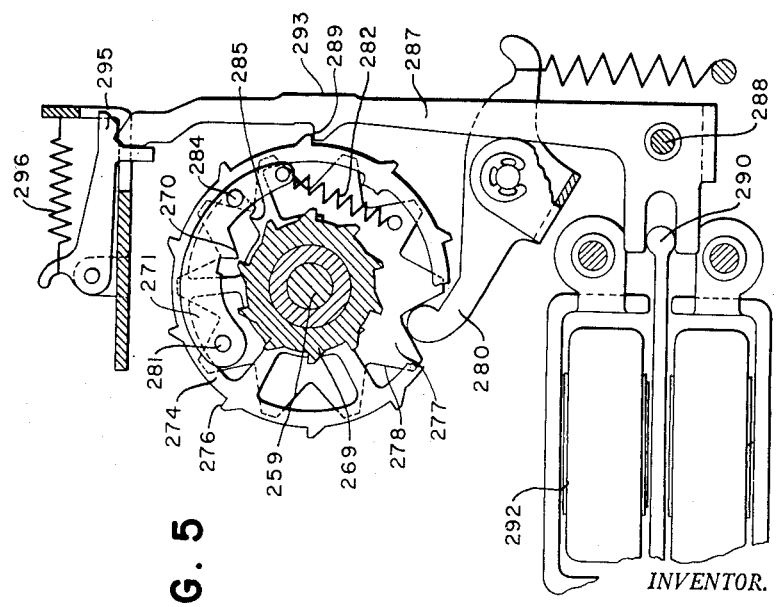

Figs. 4, 5 and 6 are vertical sectional views of the drive control unit in Fig. 3 taken on the planes of lines 4—4, 5—5 and 6—6.

Figure 7:
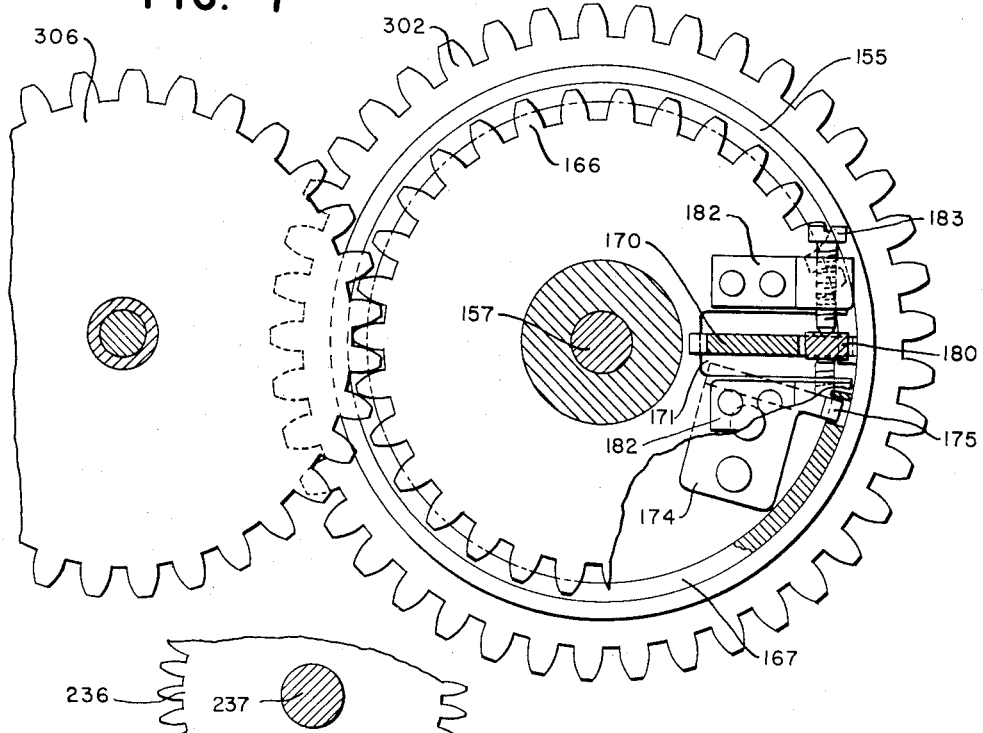
Figure 8:
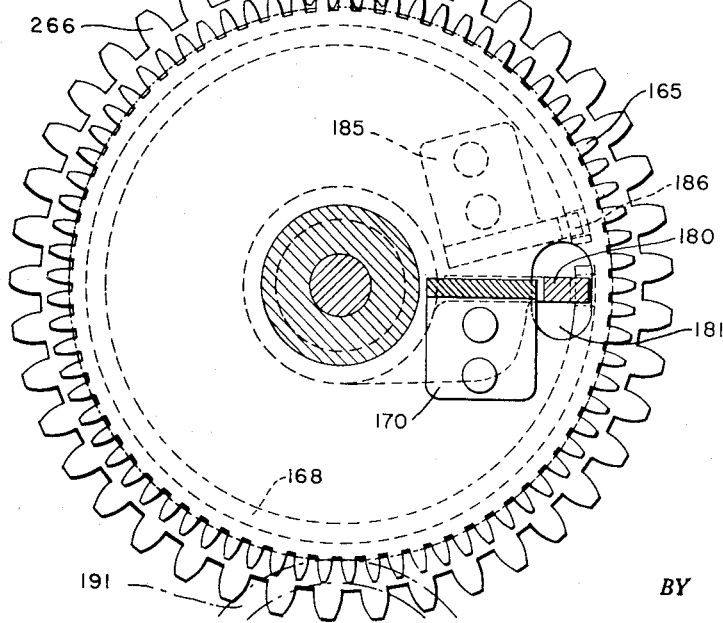

Figs. 7 and 8 are vertical sectional views of a power transmission device, taken on the lines 7—7 and 8—8 of Fig. 3, but the parts in Fig. 8 are shown rotated 180 degrees from the positions shown in Fig. 7.

Figure 1:
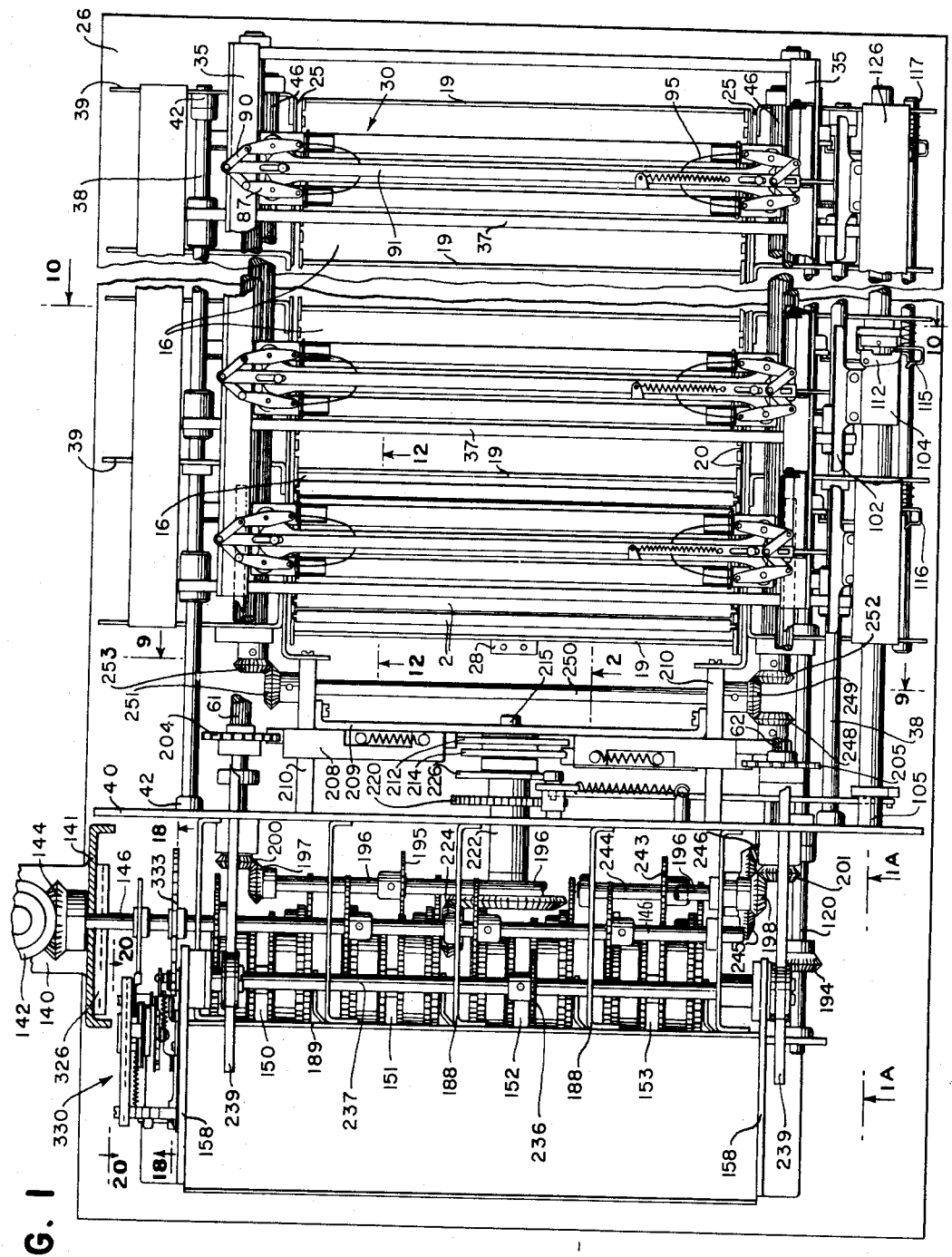
Fig. 1 is a plan view of the improved accounting machine.
Figure 9:
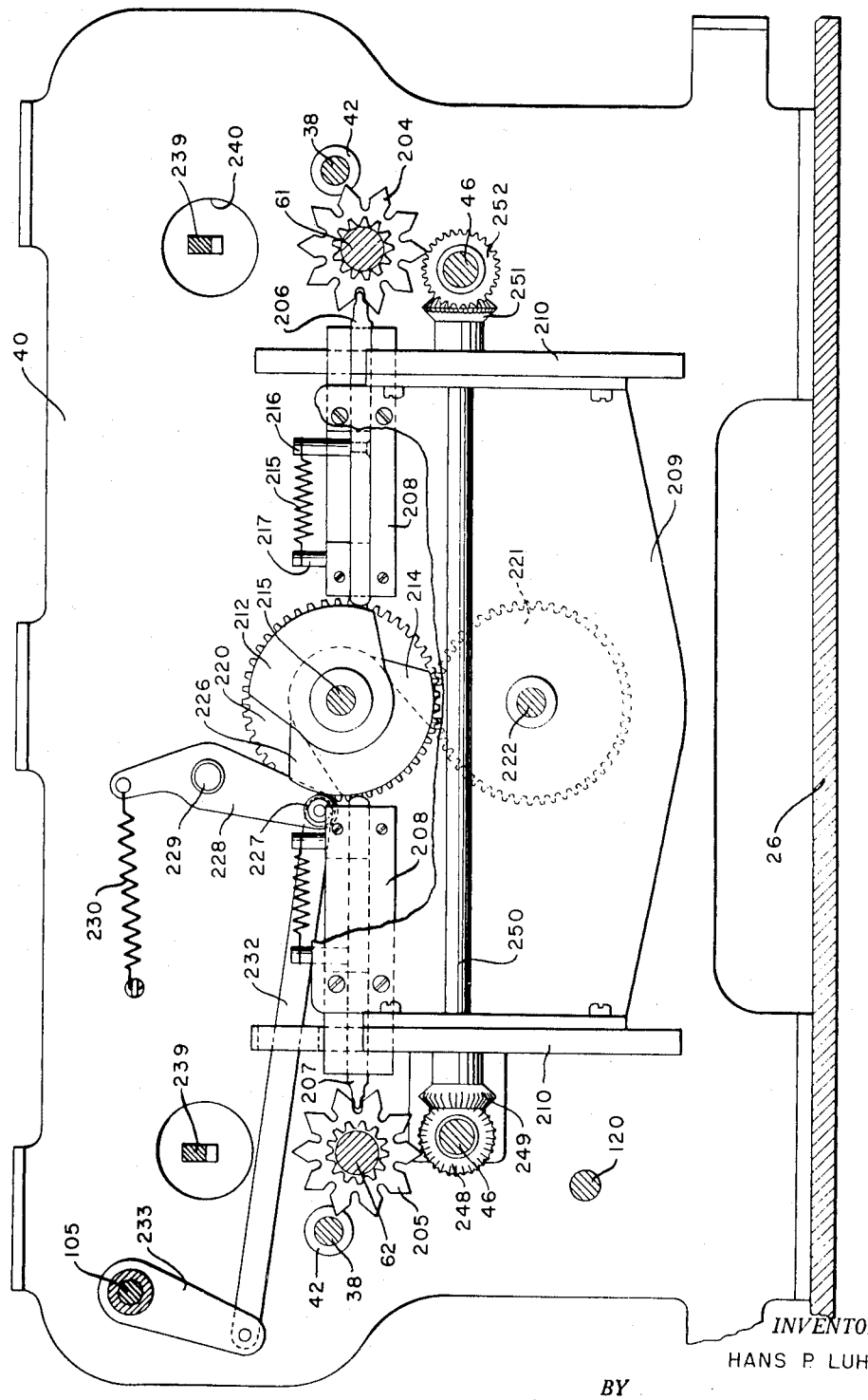
Figure 10:
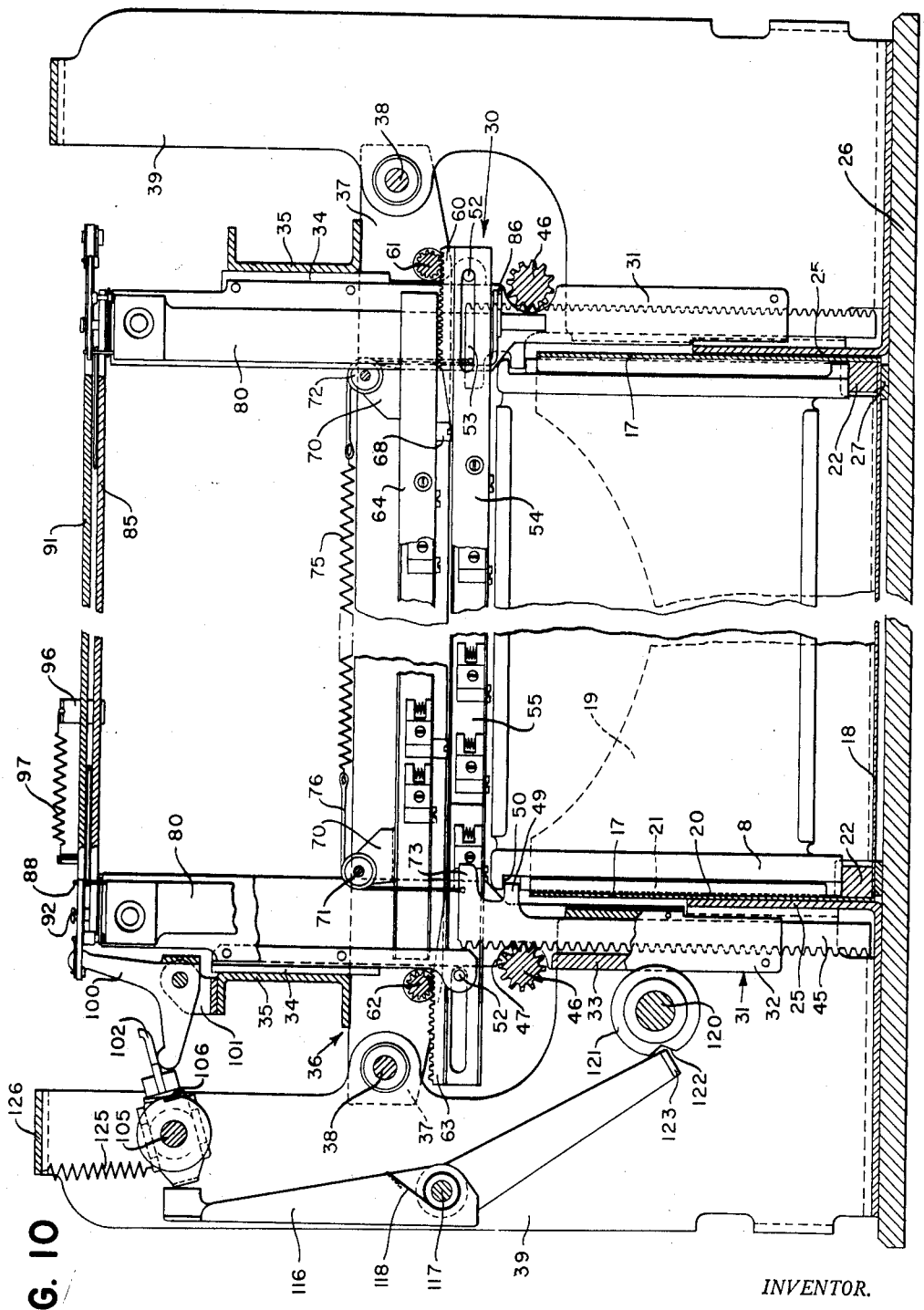

Figs. 9 and 10 are enlarged vertical sectional views taken on the lines 9—9 and 10—10 of Fig. 1.

Fig. 11 is an enlarged perspective view of one of the reading devices for the card packs.

Figure 12:
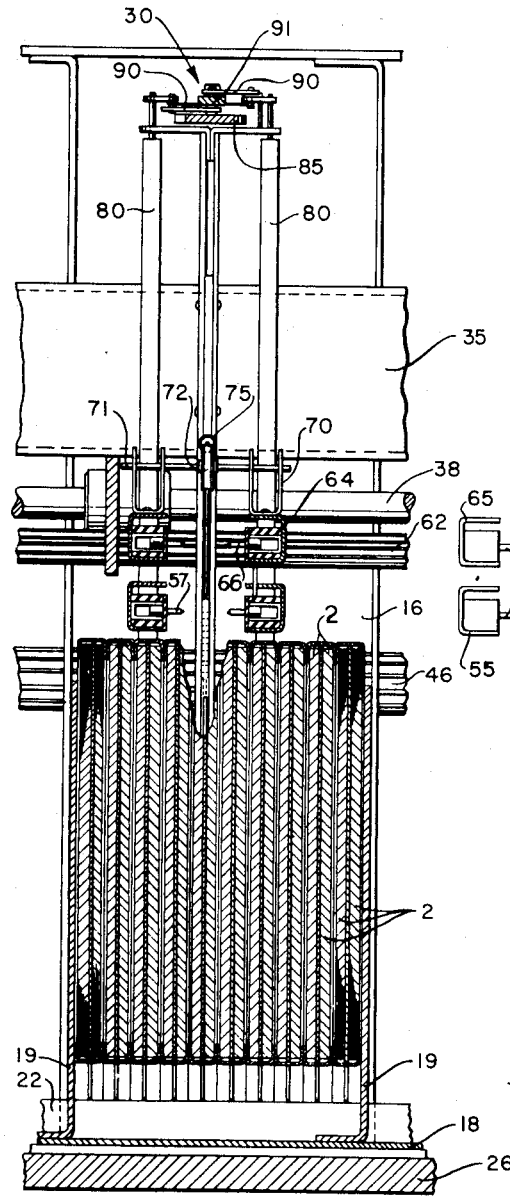

Fig. 12 is an enlarged vertical sectional view taken on the line 12—12 of Fig. 1 and shows card packs arranged within a compartment with one of the packs being lifted by a reading device.

Figure 13:
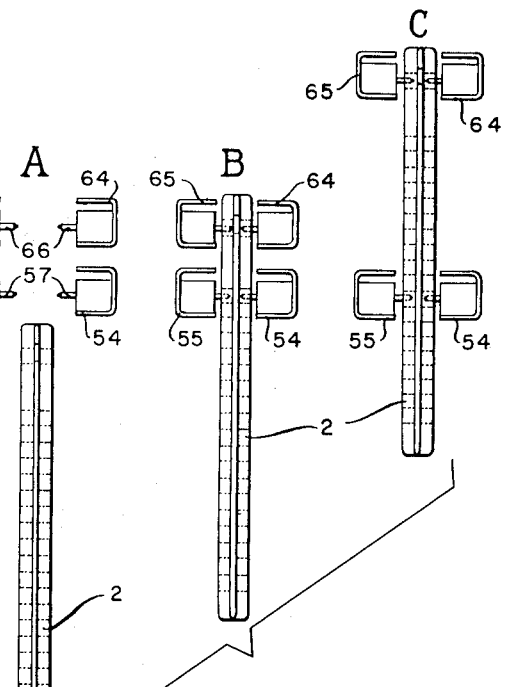

Figs. 13A, B and C show a card pack supported relative to the reading pins before lifting, being read at its No. 0 vertical position and at its No. 5 vertical position, respectively.

Figures 14, 15:
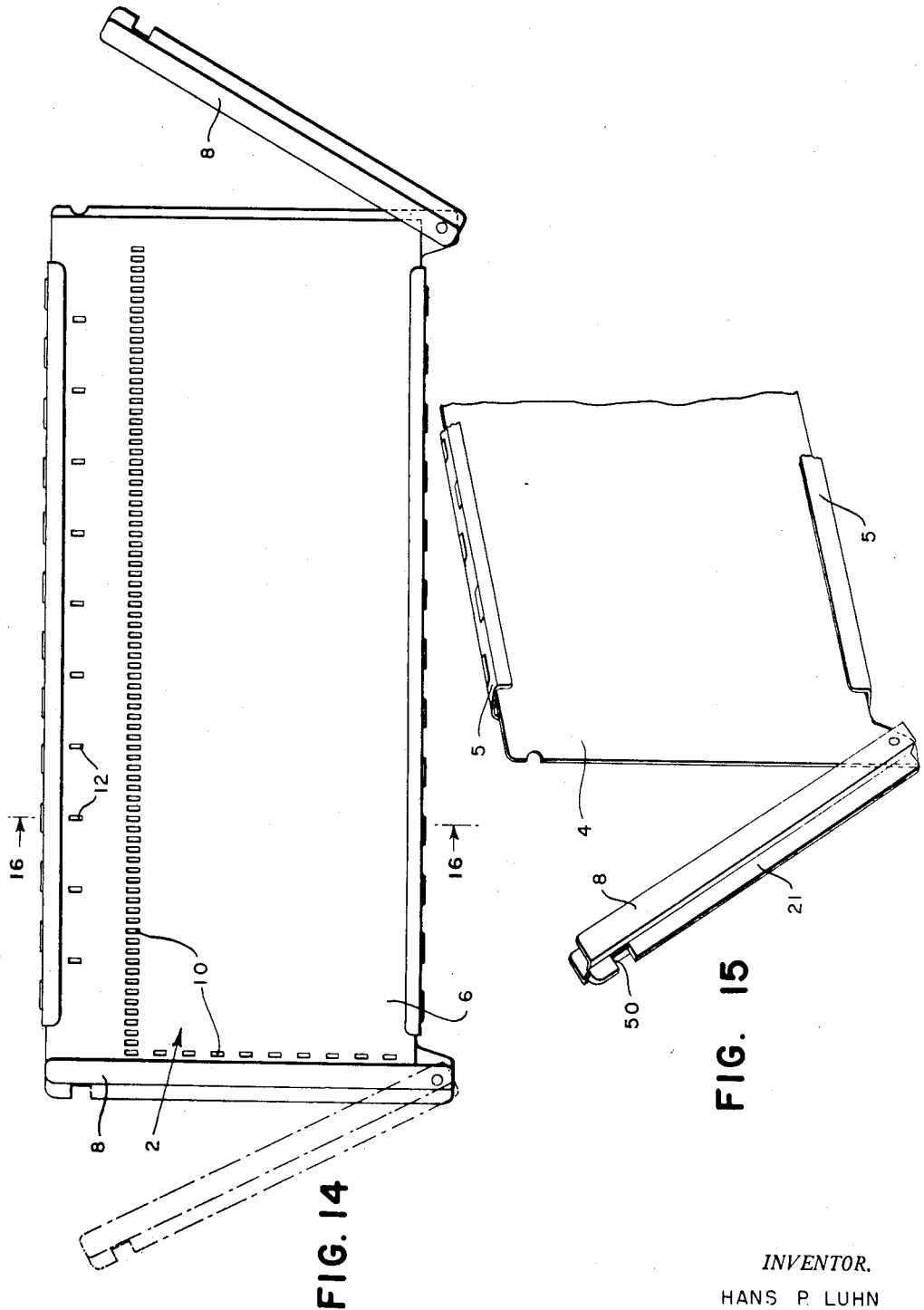

Fig. 14 shows cards arranged on a supporting frame to form a card pack.

Fig. 15 is a perspective view of a supporting frame for a card pack.

Fig. 16 is a perspective view of a card pack shown in section.

Fig. 17 is a perspective view of a printing mechanism and power means for driving this mechanism as well as the improved accounting machine.

Figure 18:
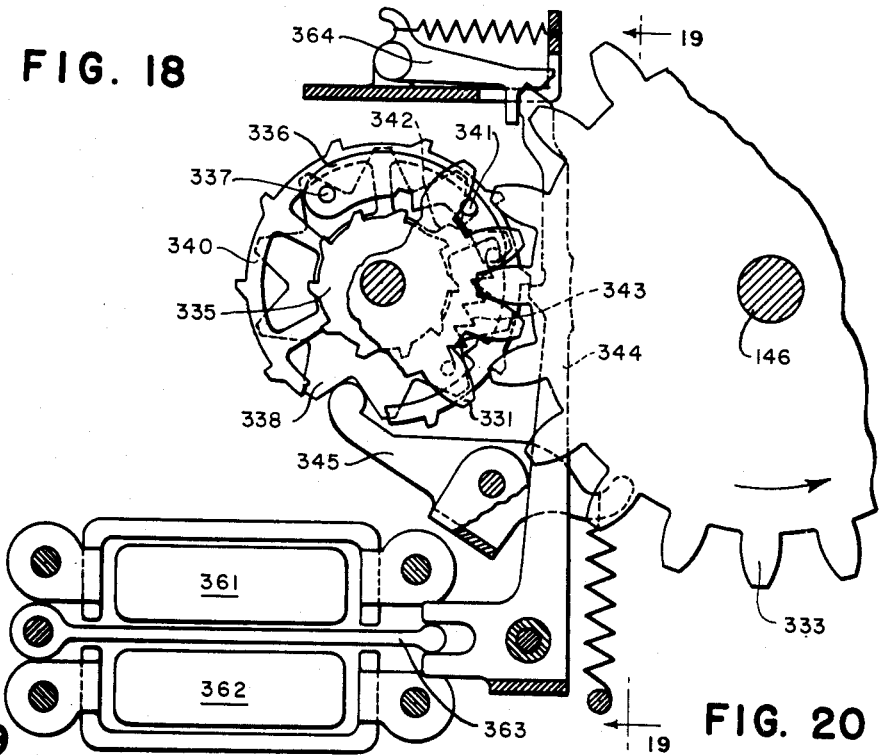

Fig. 18 is a vertical sectional view of a storage counter.

Figure 19:
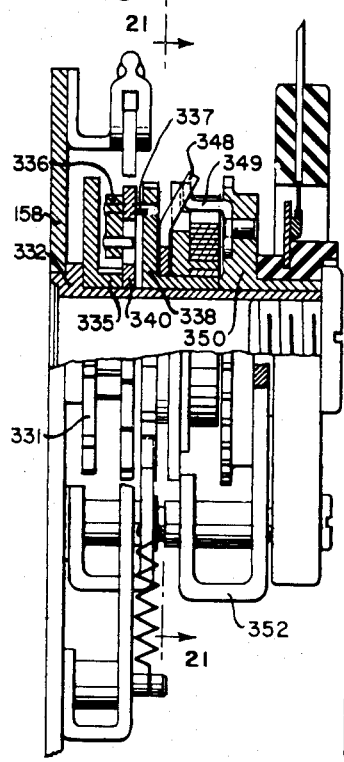

Fig. 19 is a view taken on the line 19—19 of Fig. 18 with a portion broken away to facilitate illustration.

Figure 20:
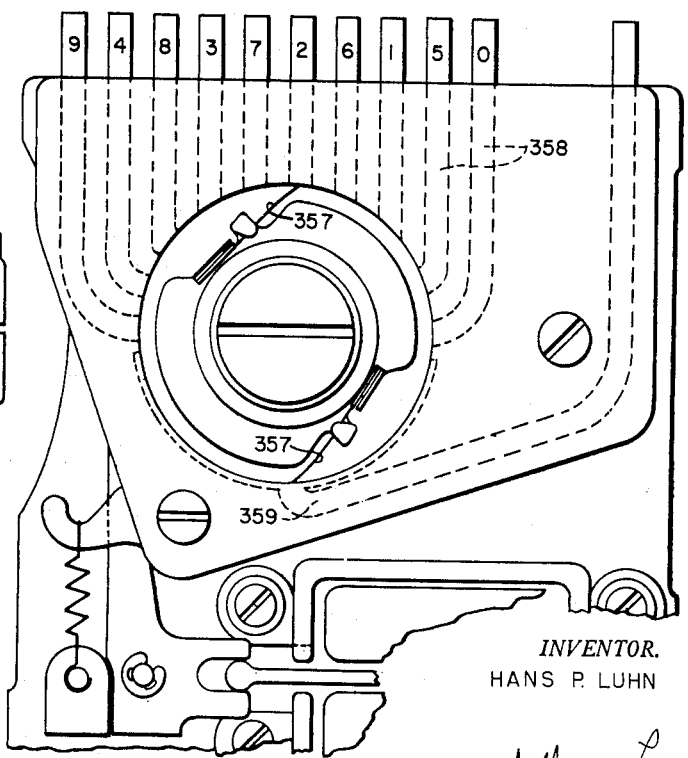

Fig. 20 is an elevational view taken on the line 20—20 of Fig. 1 and showing the storage counter of Fig. 19.

Figure 21:
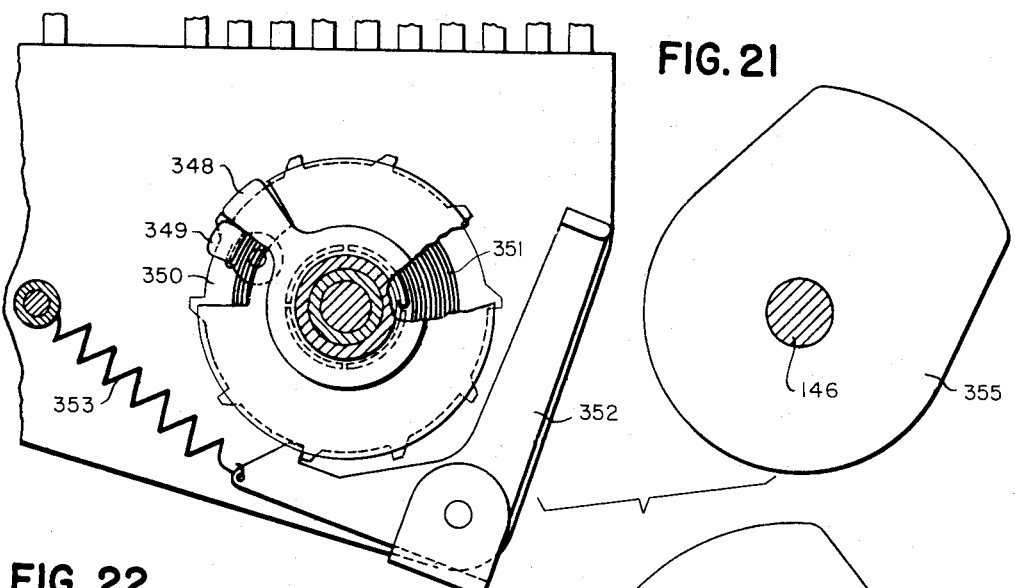

Fig. 21 is a vertical sectional view taken on the line 21—21 of Fig. 19.

Figure 22:
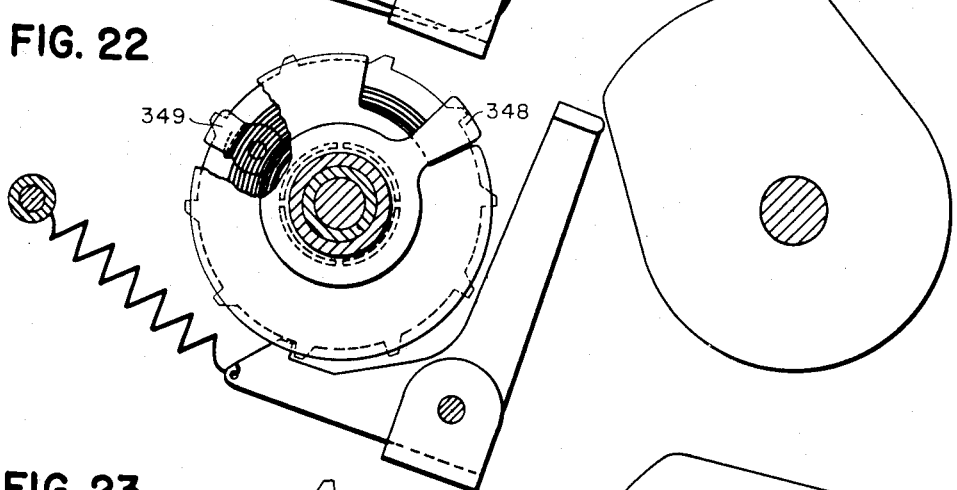
Figure 23:
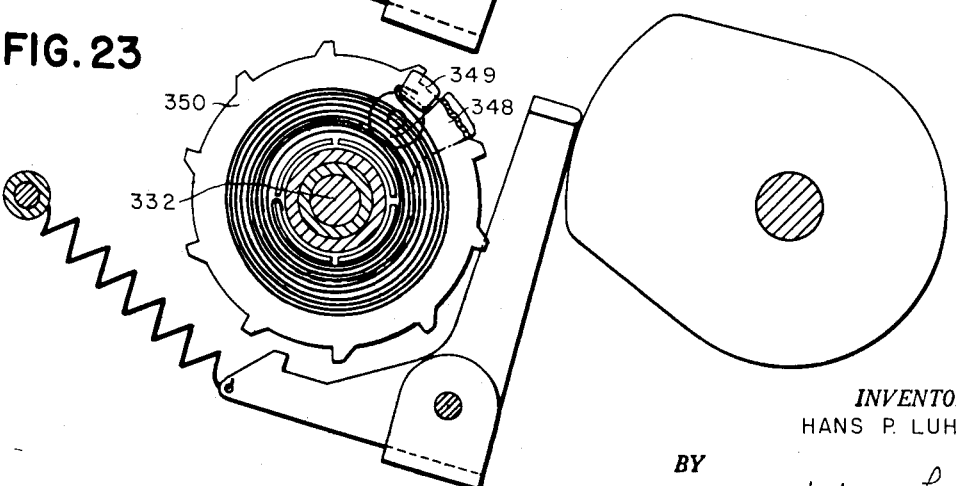

Figs. 22 and 23 are views like that of Fig. 21 but showing parts in different positions.

Figure 24A:
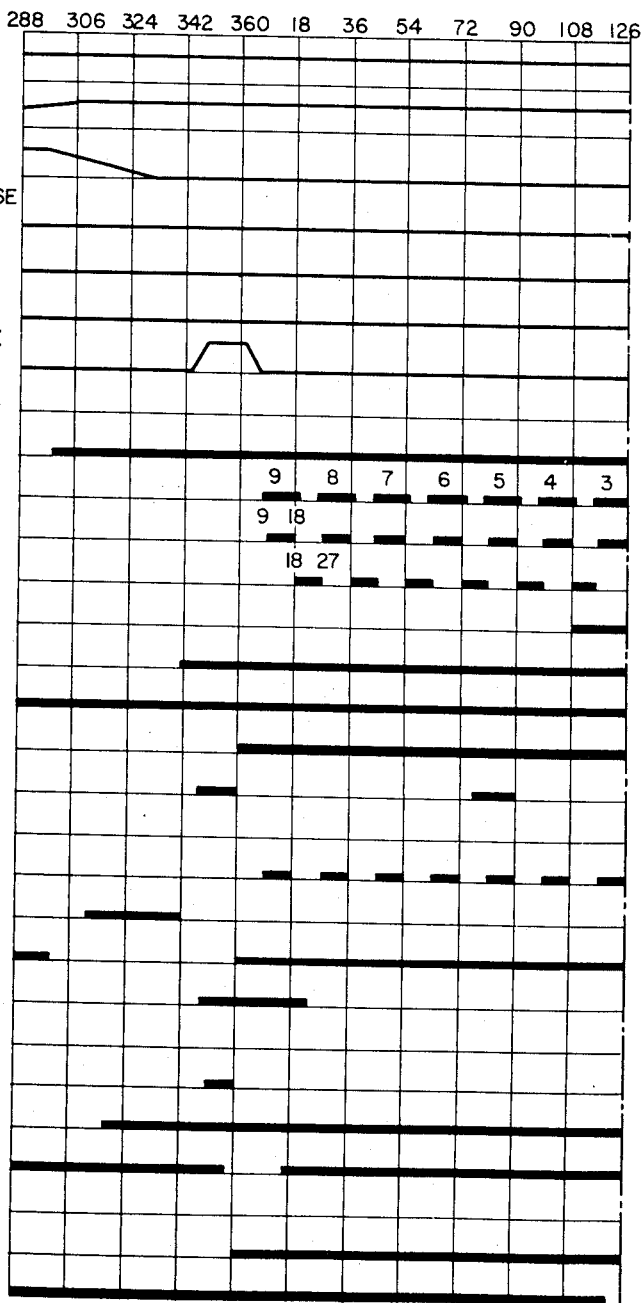
Figure 24B:
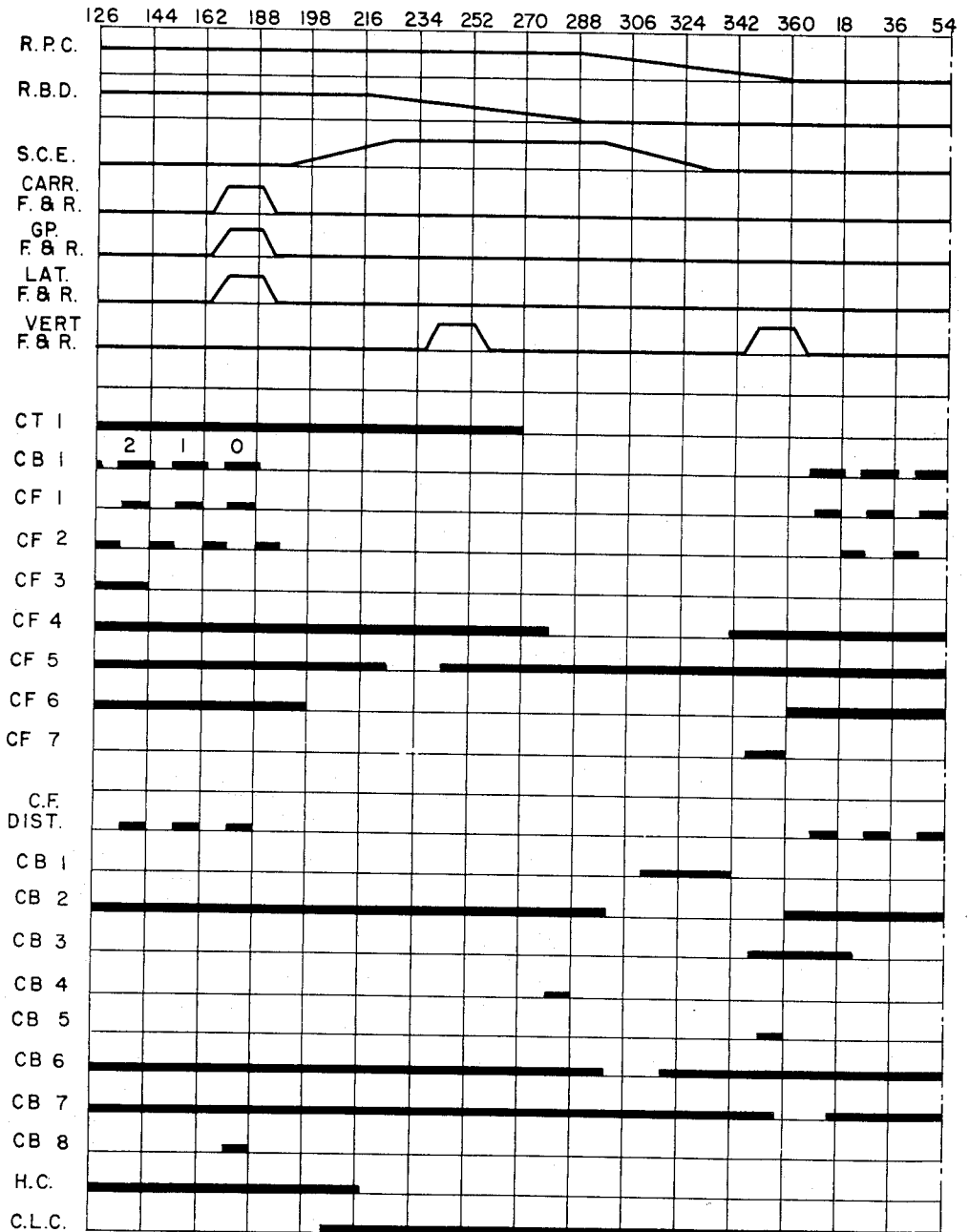
Figure 24C:
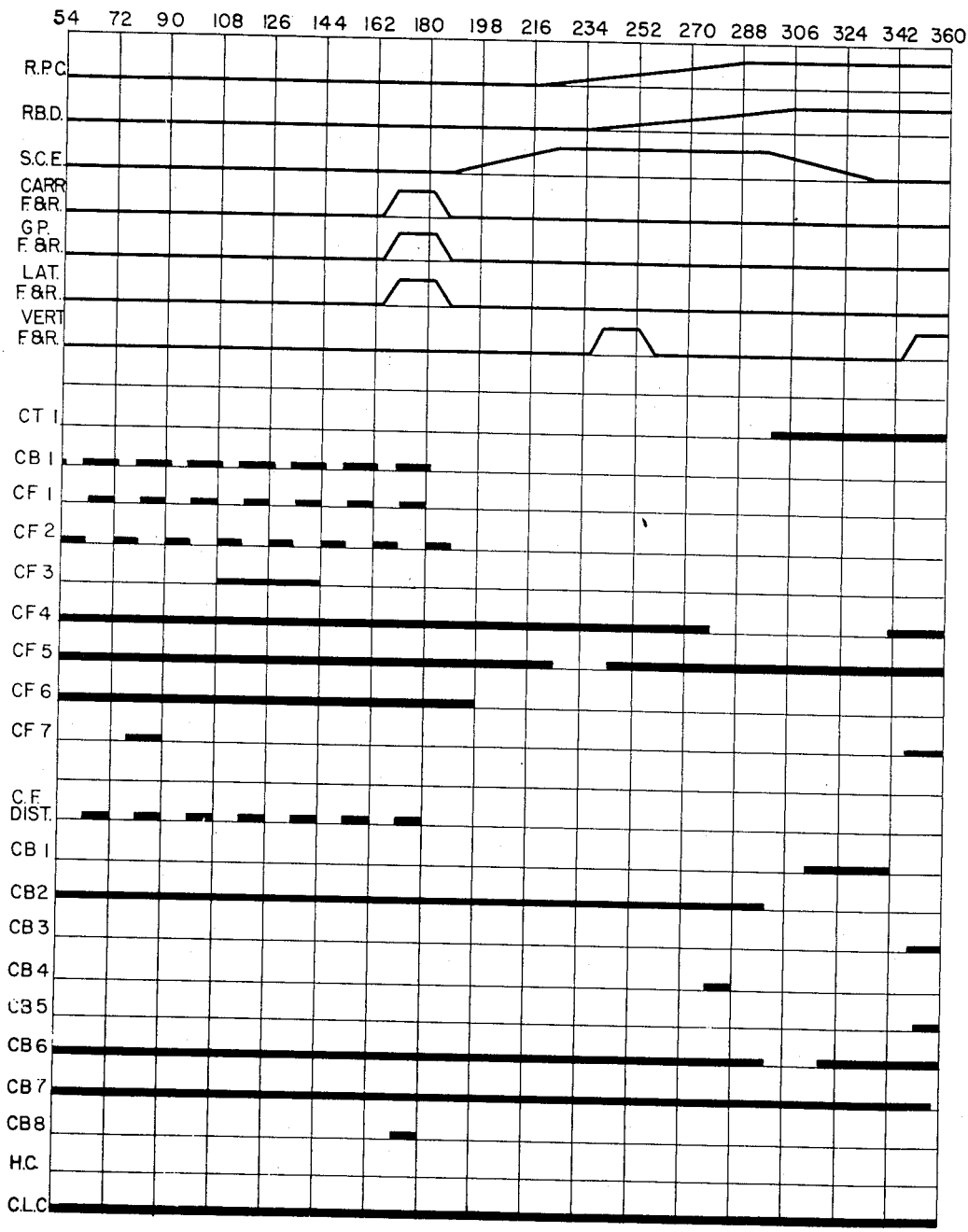

Figs. 24a to 24c taken together form a timing diagram for the accounting machine.

Figure 25A:
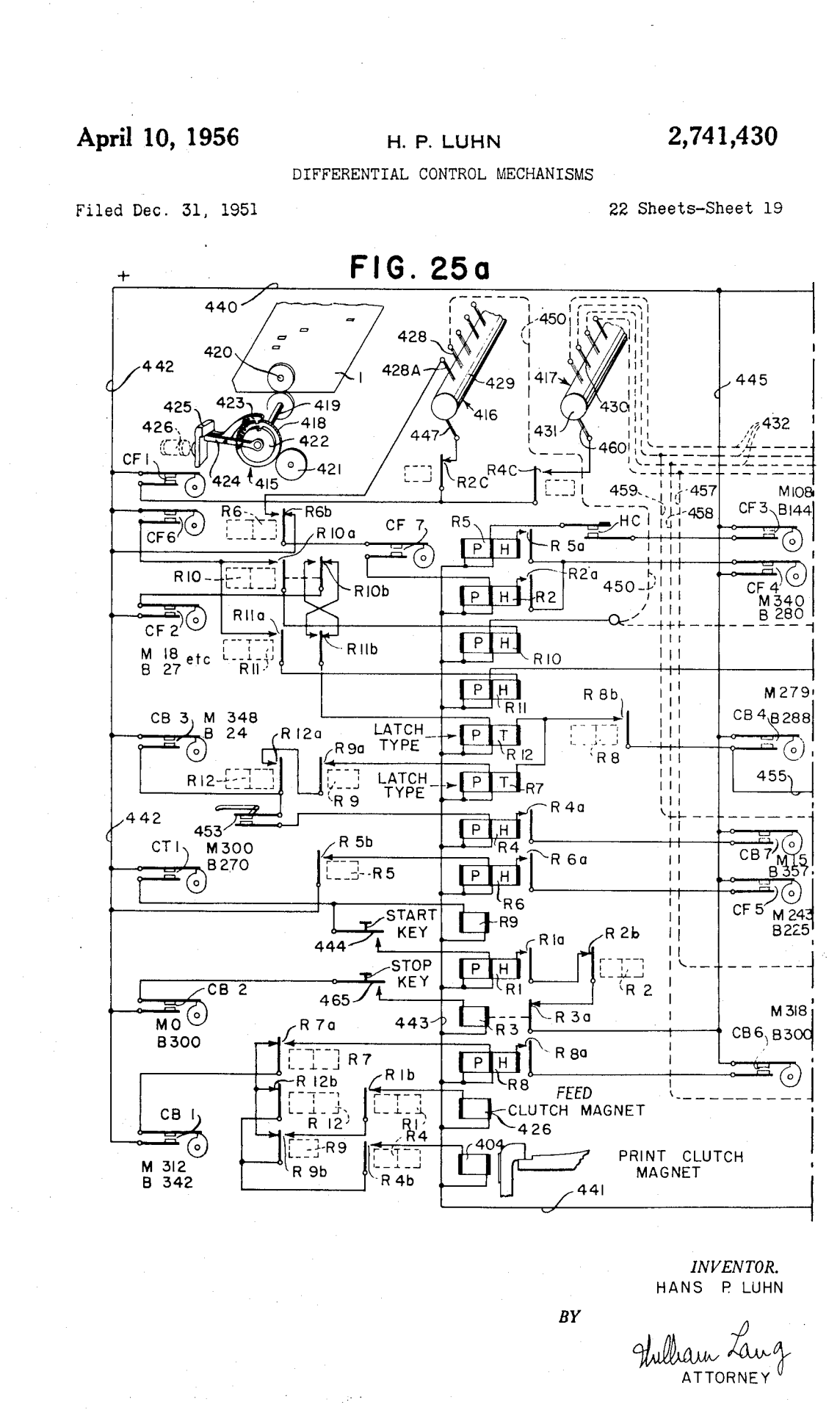
Figure 25B:
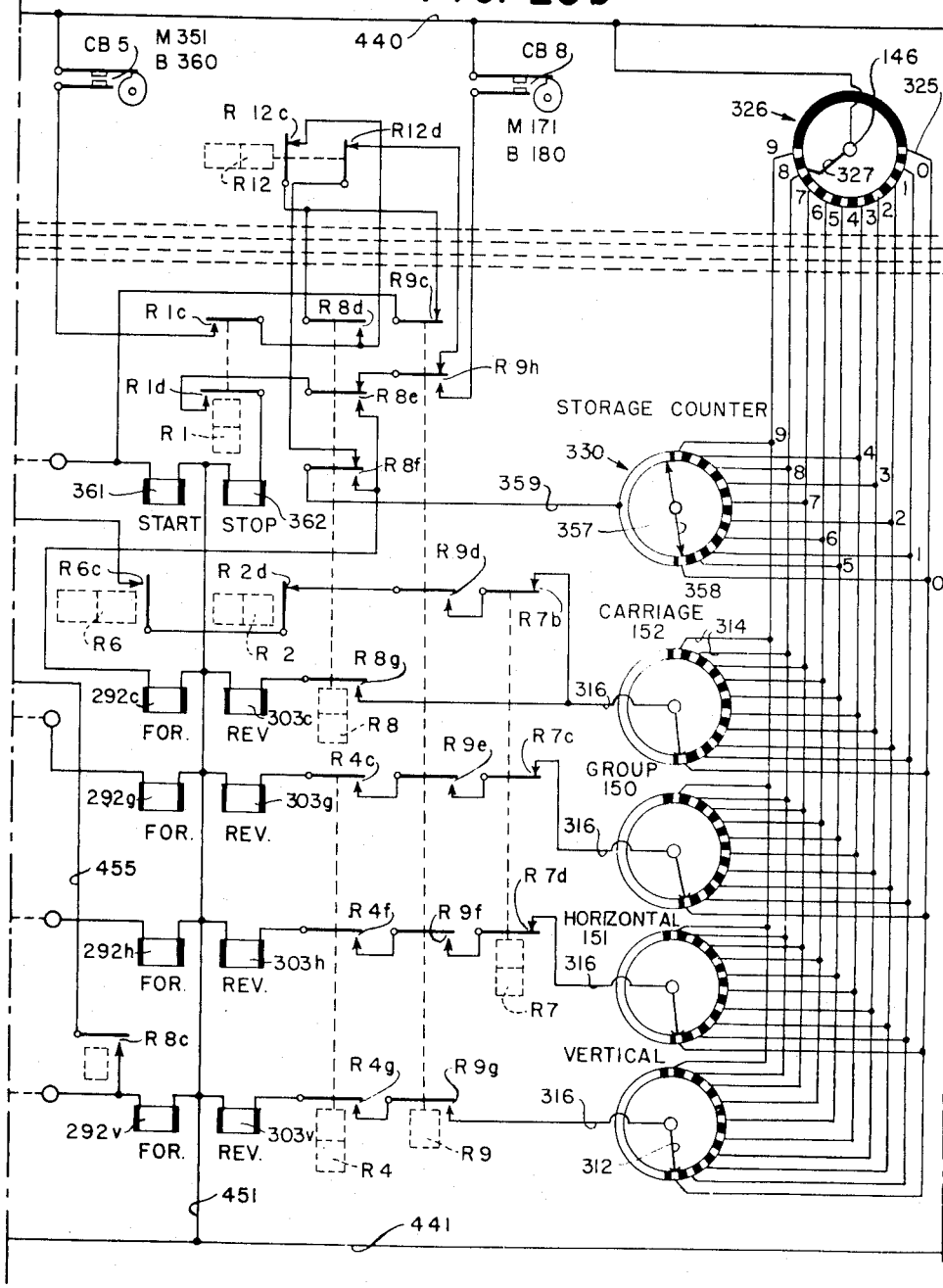
Figure 25C:
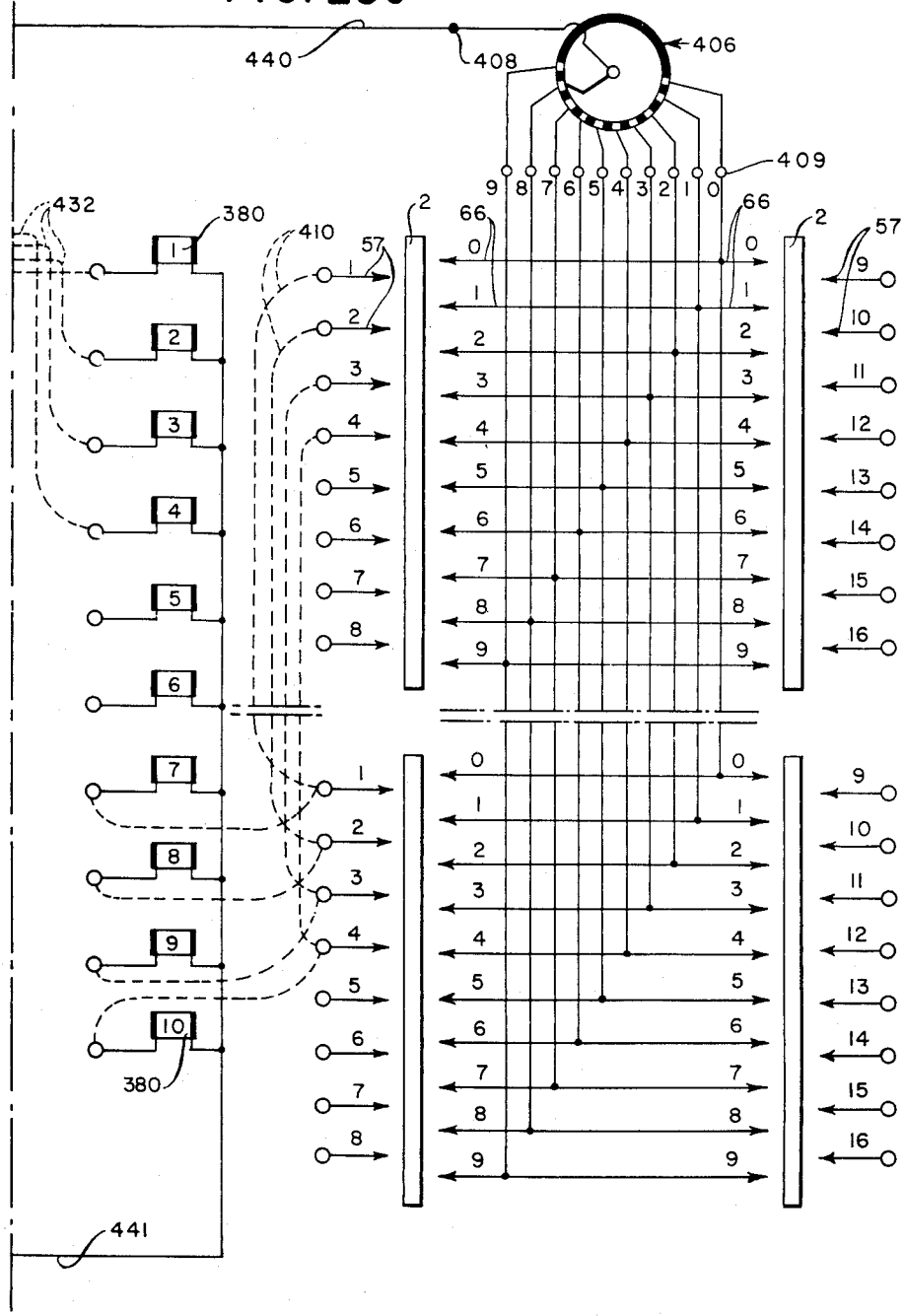

Figs. 25a to 25c show the wiring for the improved accounting machine.

Figure 26:
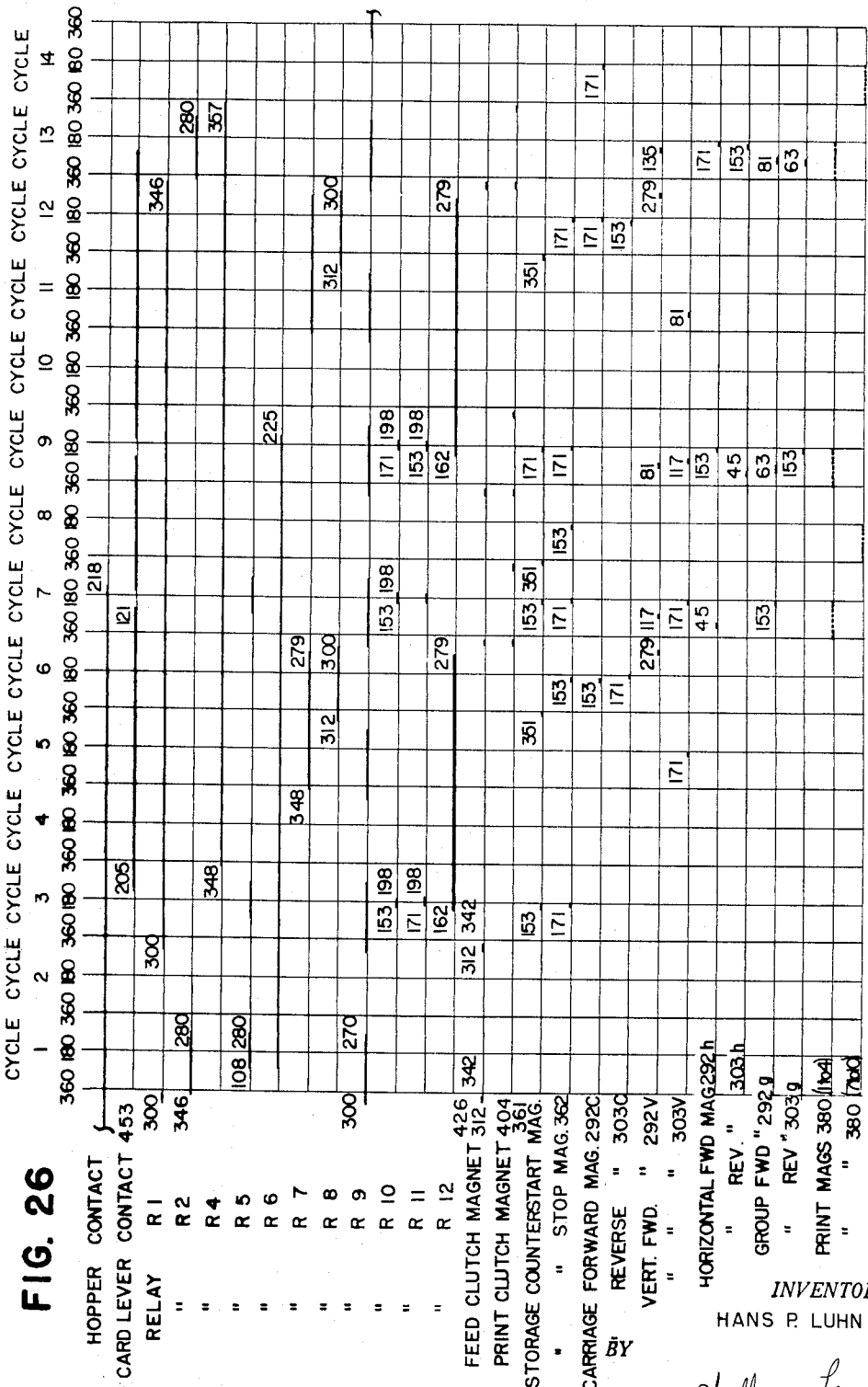

Fig. 26 shows the timing for the energizing of relays and magnets during a sample operation.

*Information storage devices*

The improved accounting machine disclosed herein operates automatically on the sensing of perforations in cards 1 (Fig. 25a) for reading out information from storage devices in the form of card packs 2 (Figs. 12 to 16). Each card pack comprises, as shown in Fig. 16, two groups of ten cards 3 arranged on opposite sides of a center plate 4 and supported at their upper and lower edges by channel shaped members 5 attached to the plate 4. The cards are made of a nonconductive material, but formed on each card at its side farthest from the plate 4 is a coating of conductive material, such as silver. At the face of the outermost card in each group is a sheet 6 of insulating material, such as mica, held in place by the channel shaped members 5. Pivotally connected to the plate 4 at its lower corners are channel shaped members 8 (Fig. 15) adapted to fit over the ends of the cards 3 and the sheets 6 for holding them in place. The bottom of each member 8 is engageable with the ends of the cards and the sheets 6 for positioning them longitudinally into proper alignment with each other.

Each of the cards 3 has index points at which perforations may be formed if desired, and these index points are arranged in horizontal and vertical rows. Formed in each sheet 6 of insulating material are openings 10 (Figs. 14 and 16) overlying the index points on the cards. As shown herein, there are eighty vertical rows of index points with ten points in each row representing, from top to bottom, the numbers 0 to 9. If none of the cards are perforated and a contact element is inserted through one of the openings 10, the element will contact the conductive coating of the outermost card which, in this case, will be the No. 0 card. If the outermost card is perforated at the point where the contact element is inserted, then the element will engage the No. 1 card. Perforations in the two outer cards results in an engagement of the contact element with the No. 2 card. Since there are ten cards in each group, it will be seen that contact may be obtained with any one of the cards representing numbers 0 to 9.

Along the upper edge of each insulating sheet 6 is a row of ten openings 12 through which contact elements may be inserted. None of the cards are perforated at the point underlying the opening 12 at the left hand end in Fig. 14. At the second opening from the left only the outermost card is perforated. At the third opening from the left the two outer cards are perforated. This continues until all but the innermost card is perforated at the point underlying the opening 12 at the right hand end. If contact elements are inserted through all of the openings 12, it will be seen that each card in the group will be contacted by one of the elements. If other contact elements are inserted at the same time through the openings 10, it will be seen that these elements will be electrically connected to the elements at the openings 12 through the conductive coatings on the cards 3. The cards are perforated at the index points underlying the openings 10 in accordance with information that the operator desires to read out later, and the connections between the contact elements at the openings 10 and 12 are dependent upon the information stored in the card packs.

*Card pack supporting means*

The card packs 2 are supported in upright positions within compartments 16 (Figs. 1 and 12) of a drawer having side walls 17, a bottom 18, and transversely extending partitions 19 separating the compartments from each other and forming the end walls of the drawer, as shown in Fig. 1. There are ten compartments which are representative of the numbers 0 to 9 reading from left to right in Fig. 1. Formed in the side walls 17 are vertical slots 20 for slidably receiving flanges 21 (Fig. 15) on the channel shaped members 8 of the supporting frames for the card packs. Extending longitudinally of the drawer at its lower corners are blocks 22 (Fig. 10) on which the lower ends of the members 8 rest for supporting the card packs in the desired positions. Each of the compartments is adapted to contain ten card packs which are representative of numbers 0 to 9 reading from left to right in Figs. 1 and 12.

During operation of the improved accounting machine, the drawer is inserted between side plates 25 (Fig. 10) mounted on a base plate 26 for the machine and is slidably supported by bars 27 resting upon the base plate. The drawer is moved to the left in Fig. 1 until its forward end engages an abutment 28 attached to the base plate 26, and then it is locked in position by suitable means, not shown.

Card pack reading mechanism

Associated with each compartment 16 is a mechanism, generally designated 30 (Figs. 1, 10, 11 and 12) adapted to read out the information stored in the card packs. These mechanisms are arranged over the compartments and are adapted to be moved together transversely of the compartments into positions in vertical alignment with the card packs in their respective compartments.

Each reading mechanism for the card packs comprises a guide member 31 (Figs. 10 and 11) arranged in an upright position adjacent each of the side walls 17 for the drawer containing the card packs. The guide members are made up of plates 32 connected to spacer bars 33, and formed on the plates near their upper ends are flanges 34 which are connected to channel shaped members 35 of a carriage, generally designated 36. The members 35 extend the full length of the card pack drawer, as shown in Fig. 1, and are mounted upon transversely extending bars 37 which are slidably supported by rods 38. Attached to the base plate 26 are supporting plates 39 (Figs. 1 and 10) having openings through which the rods 38 extend. The left hand ends of the rods 38 in Fig. 1 are received by openings in a partition 40 which is mounted, as shown in Figs. 2 and 9, on the base plate 26. Attached to the rods adjacent their ends are collars 42 acting against the partition 40 and the outer supporting plate 39 for holding the rods in place.

Referring to Figs. 10 and 11, it will be noted that a rack 45 is slidably received within each guide member 31 between the plates 32. Pinion shafts 46 extend through notches 47 in the guide members to mesh with the racks 45, and each of these shafts is rotatably supported by the plates 39 at opposite ends of the card drawer. The shafts 46 are adapted to be driven in either direction, by mechanisms to be described later, for moving the racks 45 upwardly or downwardly relative to the card packs 2. Formed on each rack is a projecting portion 49 extending into a notch 50 in the member 8 forming part of the card pack supporting frame. When the racks are in the position shown in Fig. 10, the card packs are all resting on the blocks 22 and the notches 50 are aligned with each other so that the racks may be moved transversely of the card packs until their portions 49 are received within the notches 50 of any desired card pack within the compartment associated therewith. The pinion shafts 46 may then be rotated to lift the racks and the card pack aligned with it to any desired position for sensing by mechanisms which will now be described.

Fixed within openings in the guide member 31 are pins 52 (Figs. 10 and 11) which extend through slots 53 in a pair of horizontal U-shaped members 54 and 55. These members are normally held apart, as shown in Fig. 11, so that a card pack may be moved between them by the racks 45. The members are arranged with their open sides facing each other, and mounted within these members are blocks 56 slidably supporting sensing pins 57. Associated with each of the blocks 55 is a spring 58 acting on the pin 57 for holding the latter normally in an extended position. There are eight sensing pins for each of the members, and the pins are spaced from each other distances equal to that occupied by ten vertical rows of index points on the cards to be sensed. The members 54 and 55 are permitted to move longitudinally by the slots 53 so that the sensing pins 57 may be aligned with different vertical rows of index points on the cards. When the member 54 is in its normal position, each sensing pin carried thereby is in alignment with the first vertical row of each group of ten rows reading from left to right. This member may be moved to the right in Fig. 11 from its normal position for aligning the sensing pins with any one of the rows of index points in their respective groups. It will be seen that the index points are divided into eight different fields, and each field is sensed simultaneously in the corresponding vertical and horizontal row by one of the pins 57.

Since the cards to be sensed by the pins on the member 55 face in a direction opposite to that of the cards sensed by the pins on the member 54, the member 55 must move to the left in Fig. 11 from a normal right hand position in which its pins are also aligned with the first row in each group of ten rows of index points.

For moving the member 54 longitudinally, there is provided on its right hand end (Fig. 10) a rack portion 60 meshing a pinion shaft 61 which is rotatably supported by the bars 37 of the carriage 36. The member 55 is moved longitudinally by a pinion shaft 62 rotatably supported by the bars 37 of the carriage and meshing with a rack portion 63 on the left hand end of the member 55. The shafts 61 and 62 are driven in opposite directions by means which will be described later.

When the cards are sensed by the pins 57 at the index points underlying the openings 10 (Figs. 14 and 16) in the sheet of insulating material 6, it is necessary that they be engaged by contact elements at the points underlying the openings 12. To accomplish this, there are provided U-shaped members 64 and 65 (Figs. 10 and 11) having sensing pins 66 which are slidably supported in the same manner as the pins 57. There are ten of the pins 66 arranged in vertical alignment with the openings 12 in the card packs. The members 64 and 65 are normally held apart the same as the members 54 and 55 so that a card pack may be moved vertically between them by the racks 45. Connected to the lower side of the members 64 and 65 are spacer elements 68, which engage the members 54 and 55 for supporting the members 64, 65 normally in such positions that the sensing pins 66 are spaced vertically from the pins 57 a distance equal to that between the row of openings 12 in the card pack and the top horizontal row of openings 10.

Attached to the upper sides of the members 64, 65 adjacent their opposite ends are brackets 70 rotatably supporting a rod 71 to which a pulley 72 is connected at its mid point. A portion of the pulley extends between the side plates 32 of the guide member 31, as shown in Fig. 11, and formed on the upper end of the rack 45 is a projecting portion 73 which is engageable with the pulley 72 as the rack is moved upwardly from the position shown in Fig. 10. As mentioned above, a card pack is moved upwardly with the racks due to engagement of projecting portions 49 on the racks with notches 50 in the supporting frame for the card pack. When the racks reach a position in which their portions 73 engage the pulleys 72, the card pack is in such a position that its openings 12 are aligned with the sensing pins 66 and the top horizontal row of openings 10 are aligned with the pins 57. As the racks continue moving upwardly, the members 64, 65 move with them but the members 54, 55 remain in the same horizontal positions. In this manner, the card pack may be engaged at the openings 12 by the pins 66 when the pack is in position for engagement by the pins 57 at any one of the horizontal rows of openings 10. To assure that the members 64, 65 are always in engagement with either the racks or the members 54, 55, there is provided a spring 75 which is connected at each end to a cord 76 extending over the pulley 72 and attached to the upper end of the rack 45.

When a card pack has been moved to a position for sensing, it is necessary that the members 54, 55 and 64, 65 be moved toward each other to engage the sensing pins with the cards. This is accomplished by vertical bails 80 (Figs. 10 and 11) extending through slots 81 in the members 64, 65 and slots 82 in the members 54, 55. The upper end of each bail carries a pivot pin 83 extending through an opening in an ear portion 84 on a bar 85 which is connected to the upper ends of the opposite guide members 31. The lower end of each bail carries a similar pivot pin which is received within an opening in a bracket 86 attached to the side of the guide member. The portion of the bail extending through the slots 81 and 82 is wedge shaped with the portion farthest from the pivot pins just fitting the slots 81 and 82 so that any rocking of the bails will cause movement of the sensing pins relative to the card pack. Rocking of each bail is effected by an arm 87 fixed to the pivot pin 83 and to a pin 88 at the upper end of the bail, as shown in Fig. 11. A link 90 is pivotally connected to the arm 87 and to a bar 91 (see Figs. 1, 10 and 11) which is supported for longitudinal movement by studs 92 connected to the bar 85 and slidably fitting slots 93 in the bar 91. A U-shaped spring member 95 extends through the space between the bars 85, 91 and acts on the pins 88 for urging the bails away from each other. Fixed to the bar 85 is a bracket 96 which is connected by a spring 97 to a stud 98 on the bar 91 for urging the latter in a direction to swing the bails away from each other.

When the bar 91 is moved to the left in Figs. 10 and 11, the links 90 are actuated to swing the arms 87 and the bails 80 toward each other. For moving this bar to the left, there is provided a bell crank 100 pivotally supported by a bracket 101 attached to the member 35 forming part of the carriage 36. One arm of the bell crank extends through an opening in the bar 91 while another arm lies under a bail 102 which is connected to a block 104 rotatably supported by a shaft 105 carried by the supporting plates 39. The shaft 105 is rocked intermittently by means which will be described later, and the block 104 is adapted to be connected to the shaft for rocking motion therewith by a clutch member 106 pivotally connected to the block and engageable with a notch 108 in a collar 109 attached to the shaft. The clutch member 106 is urged by a spring 110 toward the collar 109, but formed on the clutch member is a portion 112 extending across the shaft 105 and having a bent portion 114 which is engageable by a cam portion 115 of a lever 116 (see Figs. 1 and 11) for moving the clutch member away from the collar 109. The lever 116 is pivotally supported by a shaft 117 carried by the supporting plates 39 (Fig. 10), and mounted upon the shaft 117 is a spring 118 acting on the lever for urging the latter in a counter clockwise direction. Adjacent the lower end of the lever 116 is a shaft 120 rotatably supported by the plates 39 and carrying a cam 121 having a notch 122 adapted to receive a bent portion 123 on the lower end of the lever.

When the cam 121 is in such a position that its notch 122 receives the bent portion 123 of the lever, the latter is held by the spring 118 in a position free of the bent portion 114 on the clutch member 106. The clutch member then engages the notch 108 in the collar 109 for locking the block 104 to the shaft 105 so that the bail 102 is rocked to effect operation of the card sensing mechanism. A light spring 125 is connected between the block 104 and a plate 126 attached to the upper ends of the supporting plates 39 for holding the block in position to obtain actuation of the clutch member 106 by the lever 116 and for taking up link slackness. The tension of the spring is insufficient to actuate the bail 102 for rocking the bell crank 100. When the cam 121 is in a position to be engaged at its high portion by the lever 116, the clutch member 106 is held by the lever out of engagement with the notch 108 so that the bail 102 will not be operated to actuate the associated reading mechanism 30.

The notches 122 in the cams 121 controlling the different reading mechanisms are spaced angularly from each other so that only one of the notches will be in position at a time to receive the lower end of the lever 116. Since there are ten reading mechanisms, one for each compartment, there are ten cams 121 and ten positions that the shaft 120 may be turned to for making the reading mechanisms selectively effective to take a reading from a card pack. The different reading mechanisms are representative of the numbers 0 to 9 reading from left to right in Fig. 1.

*Driving means for card reading mechanisms*

As described above, there may be four different operations of the card reading mechanisms in selecting a card pack and taking a reading from it. The carriage 36 is first moved horizontally to position the reading mechanisms in alignment with corresponding card packs in the different compartments. The card packs in line with the reading mechanisms are then lifted to positions where the lower reading pins 57 are aligned with corresponding horizontal rows of openings 10 in the card packs. While the card packs are being lifted, the reading pins 57 are shifted laterally to align them with corresponding vertical rows of openings 10 in each of the card packs. At the same time, the shaft 120 is rotated to position the cams 121 so that only one of them is in position to receive the lever 116 in its notch 122 for effecting an actuation of the members 54, 55 and 64, 65 to take a reading from a card pack.

It will be understood that all of the reading mechanisms move corresponding card packs in their compartments to similar positions and shift to corresponding positions relative to the packs, but only one of the mechanisms is operated to take a reading. The amount of each movement is determined by the sensing of perforations in the card 1 (Fig. 25a). Mechanisms for controlling the operation of the driving means in response to the sensing of cards will be described later.

For driving the various mechanisms, there is provided, as shown in Fig. 17, a motor 130 having a gear 131 connected to its power shaft and meshing with a gear 132 on a shaft 133 which is rotatably supported by a stationary member 134. A bevel gear 136 on the shaft 133 meshes a bevel gear 137 on a shaft 138 which is rotatably supported by a bracket 140 attached, as shown in Fig. 1, to an upright member 141 on the base 26 of the accounting machine. At spaced points on the shaft 138 are bevel gears 142, 143 meshing with bevel gears 144, 145 on shafts 146, 147 extending transversely of the accounting machine. The meshing of the gears is such that the shafts are driven in opposite directions.

Arranged at the left hand end of the machine in Fig. 1 are transmission devices 150, 151, 152 and 153 through which drive may be transmitted from the shafts 146, 147 to the different mechanisms for reading the card packs. Each of the transmission devices comprises, as shown in Fig. 3, a pair of drums 155, 156 rotatably mounted on a shaft 157 which is fixed at its ends in plates 158 (Fig. 1) mounted on the base plate 26. Formed on the drums 155, 156 are gear portions 160, 161 which mesh, as shown in Fig. 4, with gears 162, 163, respectively, fixed to the shafts 146, 147. The direction of rotation of the gears 162, 163 is such as to drive the drum 155 in a clockwise direction in Figs. 4 and 7 while the drum 156 is driven in a counter clockwise direction.

Arranged between the drums and rotatably mounted on the shaft 157 is an output gear 165, and rotatably mounted on a hub portion of the output gear is a control gear 166. Located within the drums 155, 156 are friction bands 167, 168, respectively, which are engageable selectively with the drums for effecting a driving of the output gear 165 in one direction or the other. Attached to the upper side of the output gear 165 in Fig. 3 is a member 170 which extends through a radial slot 171 (see also Fig. 7) in the control gear 166 and has a tongue portion 172 fitting within an opening in the friction band 167 adjacent one of it ends. Fixed to the upper side of the control gear 166 (see Fig. 7) is another member 174 having a tongue portion 175 fitting within an opening in the friction band 167 adjacent its opposite end.

It will be noted in Fig. 7 that any rotation of the control gear 166 in a clockwise direction relative to the output gear 165 causes the friction band 167 to expand until it engages the interior of the drum 155 and is locked to the latter for rotation therewith. If the control gear continues to rotate in a clockwise direction at the same speed as the drum, then the friction band will be maintained in locking engagement with the drum. Since the output gear 165 is connected to the friction band through the member 170, then the output gear will be rotated with the drum 155 as long as the locking engagement is maintained. As soon as the control gear stops, the motion of the output gear relative to the control gear causes the friction band to be contracted until it is disengaged from the drum and breaks the driving connection.

Similar means are provided for connecting the drum 156 to the output gear upon rotation of the control gear 166 in a counterclockwise direction in Fig. 7. This means comprises a member 177 (Fig. 3) having a collar portion 178 rotatably mounted on a hub portion of the drum 156. Formed on the member 177 is a tongue 179 fitting within an opening in the friction band 168 adjacent one of its ends. The member 177 also has an arm portion 180 extending through an opening 181 in the output gear 165 and terminating at a point adjacent the near side of the control gear 166. Fixed to the control gear at the edges of the slot 171 (see Figs. 3 and 7) are two blocks 182 having openings in which screws 183 are threaded to act on opposite sides of the arm 180. Attached to the output gear 165 is a member 185 (Fig. 8) having a tongue 186 fitting within an opening in the friction band 168 adjacent its opposite end.

When the control gear 166 rotates in a counterclockwise direction in Fig. 7 (clockwise direction in Fig. 8) relative to the output gear, one of the screws 183 acts on the arm 180 for moving the member 177 in a direction to expand the friction band 168 into engagement with the drum 156. This same movement of the control gear causes the friction band 167 to be contracted so that there can be no engagement between it and the drum 155. With the friction band 168 engaging the drum 156, it is rotated with the latter and causes the output gear to be driven with the drum. When the friction band 167 is engaged with the drum 155, the member 177 causes the friction band 168 to be contracted so that it is free of the drum 156. The parts of the transmission devices are held in their proper operating positions by plates 188 connected between the partition 40 (Fig. 1) and a partition 189.

Figure 1A:
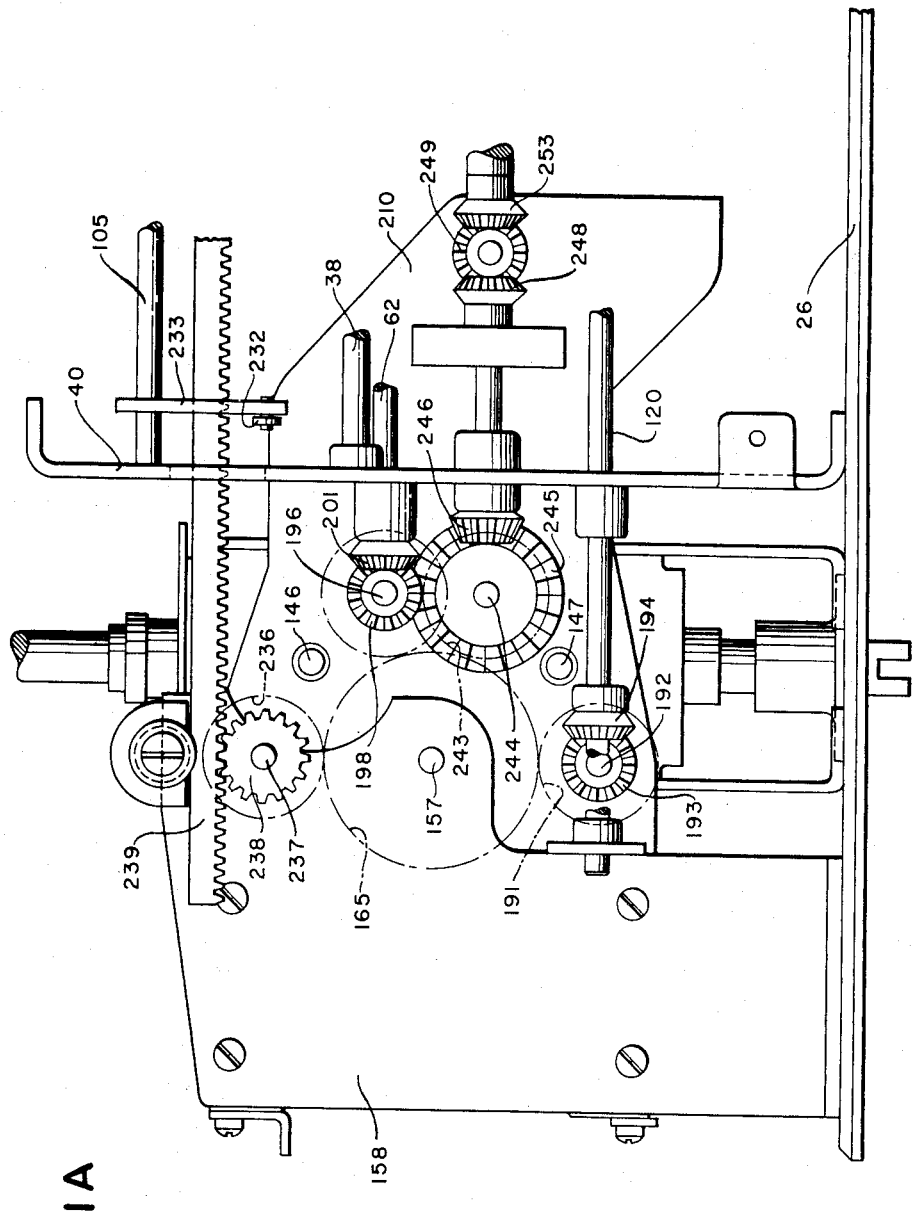
Fig. 1A is a side elevational view taken on the line 1A—1A of Fig. 1.

The control gear 166 for each of the transmission devices is operated by a control mechanism, generally designated 190 in Fig. 3, which will be described in detail later. The output gear 165 for the transmission device 150 meshes with a gear 191 (Figs. 1A and 2) fixed to a shaft 192 which is rotatably supported by the plates 188. Fixed to one end of the shaft 192 is a bevel gear 193 (Fig. 1A) meshing a bevel gear 194 on the shaft 120 which carries the cams 121 controlling the moving of the sensing bars toward and away from a card pack.

The output gear 165 for the transmission device 151 meshes a gear 195 (Fig. 1) fixed to a shaft 196 which is rotatably supported by the plates 188. Attached to the ends of the shaft 196 are bevel gears 197, 198 meshing with bevel gears 200, 201 on the pinion shafts 61, 62, respectively. These are the shafts which engage, as shown in Fig. 10, the racks 60 and 63 on the members 54, 55 for positioning the pins 57 in line with selected vertical rows of openings 10 in the card packs.

It is necessary that the reading pins be accurately positioned so that they may enter the openings 10. To obtain such accurate positioning, there is provided a detent mechanism including, as shown in Figs. 1 and 9, toothed wheels 204, 205 fixed to the shafts 61, 62. Bars 206, 207 are slidably supported by blocks 208 attached to a plate 209 which is connected at its ends to support members 210 extending between the partition 40 and the side plates 25, as shown in Fig. 1. The outer ends of the bars 206, 207 are adapted to be projected between adjacent teeth on the wheels 204, 205 for centering the shafts 61, 62, and the inner ends of the bars engage cams 212, 214 fixed to a shaft 215. Each of the bars is held in engagement with its cam by a spring 215 connected between studs 216, 217 on the bar and the block 208, respectively.

The shaft 215 is rotatably supported by the partition 40 and the plate 209, and mounted on this shaft is a gear 220 meshing with a gear 221 on a shaft 222 which is also rotatably supported by the partition 40 and the plate 209. Fixed to the left hand end of the shaft 222 in Figs. 1 and 2 is a bevel gear 223 meshing with a bevel gear 224 on the drive shaft 147. The gear ratio is such that the cams 212, 214 make one revolution for every two revolutions of the shaft 147, and the cams are shaped to move the bars 206, 207 into detenting positions at 288° in one machine cycle and to move them out of such positions at 234° in the next cycle.

Mounted upon the shaft 215 is another cam 226 co-operating with a roller 227 (Fig. 9) which is carried by a lever 228 pivotally supported at 229. A spring 230 acts on the lever 228 for holding the roller in engagement with the cam. Connected to the lower end of the lever is a link 232 which is attached to an arm 233 fixed to the shaft 105. It will be remembered that the shaft 105 is adapted to be connected through clutch mechanisms 106 (Fig. 10) to the bails 102 for actuating the reading mechanisms to engage the reading pins with the card packs. The bails are operated to engage the pins with the card packs at the beginning of the cycle following the operation of the detenting mechanism and to hold them engaged until 216° in that cycle.

The transmission device 152 has its output gear 165 in mesh with a gear 236 (Figs. 1, 2 and 4) on a shaft 237 rotatably supported by the plates 188. Attached to the shaft 237 at its ends are gears 238 (Fig. 1A) engaging racks 239 which extend through openings 240 (Fig. 9) in the partition 40 and are fixed to the channel shaped members 35 of the carriage 36. As the output gear of this transmission device is caused to rotate by the control gear, the carriage 36 is moved to position the reading devices into vertical alignment with selected card packs in the different compartments.

The output gear of the transmission device 153 meshes a gear 243 (Figs. 1 and 1A) on a shaft 244. Fixed to one end of the shaft is a bevel gear 245 meshing a bevel gear 246 on a shaft which is rotatably supported by the partition 40 and carries a bevel gear 248 in mesh with a bevel gear 249 on a shaft 250 rotatably supported by the support members 210. The gear 249 and another gear 251 attached to the upper end of the shaft 250 in Fig. 1, mesh gears 252 and 253 on the pinion shafts 46 for rotating the latter in opposite directions to position a card pack vertically.

*Control mechanism for driving means*

As mentioned above, a control mechanism 190 (Fig. 3) is associated with each of the transmission devices 150 to 153. Each of the control mechanisms comprises side plates 256 mounted, as shown in Fig. 2, between horizontal portions 257 of a frame 258 arranged on the base plate 26 of the accounting machine. A shaft 259 is rotatably supported by sleeves 260, 261 press fitted within openings in the plates 256, and arranged upon the shaft are two counter units, generally designated 262 and 263, which are similar to the mechanism described by the Lake et al. Patent 2,328,653.

The counter unit 263 includes a gear 265 rotatably supported by the sleeve 261 and meshing a gear portion 266 on the drum 156. Since this drum is driven, as described above, continuously in a counterclockwise direction in Fig. 4 during operation of the machine, the gear 265 is driven continuously in a clockwise direction. Formed upon the gear 265 is a ratchet 269 (see also Fig. 5) which is adapted to be engaged by a tooth 270 on a dog 271. Freely mounted upon the sleeve 261 adjacent the ratchet 269 is a spider 274 having ten teeth 276 spaced uniformly about its periphery. At the side of the spider is a register wheel 277 rotatable on the sleeve 261 and provided with ten peripheral notches 278. The wheel 277 may take any one of ten rotative positions corresponding to the values 0 to 9. A spring pressed lever 280 is engageable with a notch 278 to hold the register wheel impositively and to center it in the value position to which it has been rotated. The dog 271 is pivotally mounted on a stud 281 which is fixed to the register wheel and projects through an opening in the spider. A spring 282 urges the dog continuously in a direction to engage the dog tooth 270 with the ratchet 269. Fixed to the dog is a stud 284 extending through an opening in the spider 274 and engageable with a cam surface 285 at the edge of the opening.

If the spider is free to turn in a clockwise direction, the dog is swung inwardly by the spring 282 until the tooth 270 engages the ratchet 269. Such movement of the dog causes the spider to rotate slightly relative to the ratchet due to the action of the stud 284 on the cam surface 285. As soon as the dog engages the ratchet, the spider and the register wheel are driven in a clockwise direction with the gear 265.

Arranged in the same plane as the spider is a latch lever 287 pivotally supported at 288 and having a tooth 289 which is engageable with any one of the teeth 276 on the spider. When the lever is in a position to engage its tooth with one of the teeth 276, the spider is held against rotation and the dog 271 is cammed outwardly to disengage it from the ratchet. The spider and the register wheel 277 are then disengaged from the driving gear 265 and are held stationary in a position determined by the lever 280. The lever 287 is operatively connected to an armature 290 of a magnet 292 as shown in Fig. 5, the arrangement being such that an energizing of the magnet causes the lever to be rocked in a clockwise direction for releasing the spider 274. Formed upon the lever 287 is a projecting portion 293 which is engageable by a projecting portion 294 (Fig. 4) on the outer periphery of the drum 156 for effecting movement of the lever to its latching position at a predetermined point in each machine cycle if it has been previously released by an energizing of its magnet 292. At the upper end of the lever 287 in Fig. 5 is a latch 295 which is urged by a spring 296 to a position for engaging the lever to hold it in engagement with the spider or in a disengaged position.

Formed integral with the register wheel 277, as shown in Fig. 3, is a bevel gear 298 which meshes a pair of bevel gears 299 rotatably mounted on a spindle 300 extending through an opening in the shaft 259. When the latch lever 287 is operated by its magnet to disengage the spider 274, the latter is turned by the stud 284 to permit the dog tooth to engage the ratchet and effect a driving of the register wheel 277. The bevel gear 298 turns with the register wheel and causes the bevel gears 299 to rotate on the spindle 300.

The counter unit 262 is like the unit 263 described above and need not be described here in detail. The parts of the unit 262 corresponding to those of the unit 263 have been given corresponding numbers followed by the letter (a). Gear 265a in the unit 262 meshes a gear portion 302 on the drum 155 and is, therefore, driven continuously in a counter clockwise direction in Figs. 4, 5 and 6. A dog 271a is engageable with a ratchet portion 269a on the gear 265a under control of a spider 274a, and this dog is fixed to a register wheel 277a so that the latter is driven with the gear 265a when the dog engages the ratchet portion. A latch lever 287a is operative to hold the spider 274a against rotation and thereby effect a disengagement of the dog from the ratchet. A magnet 303 is operative when energized to move the lever 287a out of engagement with the spider 274a, and a projection on the drum 155 is operative to move the lever into engagement with the spider at a predetermined time in each machine cycle. Fixed to the register wheel 277a is a bevel gear 298a meshing the pair of bevel gears 299.

If the bevel gear 298a is held stationary while the gear 298 is rotated in a clockwise direction, it will be seen that the gears 299 will be caused to travel around the gear 298a in a clockwise or forward feeding direction. When the gear 298 is held stationary and the gear 298a is rotated in a counterclockwise direction, the bevel gears 299 are caused to travel in a counterclockwise or reverse feeding direction around the gear 298. Rotation of the gears 298 and 298a at the same time in opposite directions and at the same speed results in a rotation of the gears 299 but there is no traveling of the latter in either direction.

Arranged on the spindle 300 between the gears 299 is a member 304 having radially projecting portions 305 (Fig. 6) to which a differential gear 306 is connected. When the gears 299 are caused to travel in either direction, the spindle 300 turns with them and causes the differential gear 306 to rotate. The gear 306 meshes the control gear 166 of the transmission device and causes the latter to rotate in one direction or the other for determining the direction in which the output gear 165 is driven by the drums 155 and 156.

Since the spindle 300 passes through an opening in the shaft 259, the latter is caused to rotate with the differential gear 306. Fixed to one end of the shaft 259, as shown in Figs. 2 and 3, is an arm 308 which is engageable by a stud 309 on a circular disk 310 rotatably supported by the shaft 259. A spring 307 is fixed to the shaft 259 and engages the stud 309 for urging the disk in a clockwise direction in Fig. 2. The disk fits within an opening in a commutator plate 311 of insulating material attached to one of the side plates 256 of the control unit, and fixed to the disk for rotation therewith is a brush 312 which is engageable at one end serially with contact elements 314 carried by the commutator plate 311 and representing numbers 0 to 9 as shown. The other end of the brush engages continuously a contact segment 315 to which a terminal 316 is connected. Fixed to the disk 310 is a member 317 having ratchet teeth 318 with which a dog 319 is engageable for holding the disk against rotation in a clockwise direction. Yielding means, not shown, are provided for holding the dog normally in engagement with the ratchet teeth.

It will be appreciated that a rotation of the shaft 259 in a clockwise direction in Fig. 2 while the dog engages the ratchet teeth, will result in a movement of the arm 308 away from the stud 309. This means that the brush 312 will continue to connect the terminal 316 to some one of the contact elements 314 while the differential gear for the control unit is rotated to effect a forward movement of some part of the card pack reading mechanism to a new position. Formed on the dog is an arm 320 which is engageable by a stud 321 on the drum 156 to effect a camming of the dog from the ratchet teeth just after 0 time in each cycle so that the brush 312 is released and takes the new setting of the shaft 259. When the shaft 259 is rotated in a counterclockwise direction, the brush 312 is moved with the shaft due to engagement of the arm 308 with the stud 309.

The position of the brush 312 determines which of the contact elements 314 is to deliver a pulse to the terminal 316. This part of the mechanism may be referred to as an emitter, and, as shown in the wiring diagram (Fig. 25b), the emitters for the different control units are connected so as to control the energizing of the reverse magnets 303 of their respective control units.

Since the transmission device 150 determines the positioning of the cams 121 for selecting the compartment or group of card packs from which a reading is to be taken, the emitter in the control unit for this device has been generally designated as the "Group" emitter in Fig. 25b. The transmission devices 151, 152 and 153 determine, as described above, the horizontal movement of the reading pins 57, the movement of the carriage 36 over the compartments, and the vertical movement of the card packs, respectively. The emitters for the control units of these devices have been designated "Horizontal," "Carriage" and "Vertical" in Fig. 25b. It will be noted that the terminals 316 of these emitters are connected through contacts of various relays, which will be described later, to the reverse magnets 303 of the control units. In order to distinguish the reverse magnets for the control units of the carriage, group, horizontal and vertical emitters, these magnets have been designated 303c, 303g, 303h, and 303v. The forward magnets for these same emitters have been designated 292c, 292g, 292h, and 292v.

Continuously running distributor

Referring to Fig. 25b, it will be noted that the contact elements 314 in the emitters of the various control units are connected to corresponding contacts 325 of a distributor, generally designated 326. This distributor is mounted, as shown in Fig. 1, upon the support member 141 and has a brush 327 connected to the shaft 146 so that it makes one complete turn each machine cycle. The brush moves over the contacts 325, which have been numbered 9 to 0, in synchronism with the sensing of corresponding numbered points on the card 1 (Fig. 25a). This card is advanced with its No. 9 points first, and the times at which card pulses may be received by the sensing of perforations, is indicated in Fig. 24a.

Storage counter

By reason of the emitters for the control units of the group, horizontal and vertical transmission devices, it is possible to obtain a shifting of the reading mechanisms by these devices from one position to another without returning to a home position. The manner in which this is accomplished will be described in connection with the control circuits. In order to obtain a direct shifting of the carriage, it is necessary that there be provided a storage counter, generally designated 330 in Figs. 1 and 18 to 23.

The storage counter is similar to the counter units 262, 263 described above. It comprises, as shown in Figs. 18 and 19, a driving gear 331 rotatably mounted upon a stub shaft 332 carried by the plate 158. The gear 331 meshes with a gear 333 on the shaft 146 so that it is driven clockwise in Fig. 18 continuously during operation of the machine. Formed upon the gear 331 is a ratchet portion 335 which is engageable by a dog 336 pivotally mounted on a stud 337 fixed to a register wheel 338 rotatably mounted on the shaft 332. The stud 337 extends through a spider 340, and another stud 341 on the dog acts on a cam surface 342 formed on the spider. The dog is moved by a spring 343 into engagement with the ratchet when the spider is free for rotation in a clockwise direction in Fig. 18. A latch lever 344 is engageable with teeth on the spider for holding the latter against rotation and effecting an outward movement of the dog by an action of the cam surface 342 against the stud 341. A spring urged lever 345 is receivable in any one of ten notches in the register wheel for centering and holding the latter in any one of ten positions, numbered 0 to 9.

Fixed to the register wheel is a member having an outwardly bent portion 348 (Figs. 19, 21 to 23) which acts as an abutment for a member 349 attached to a toothed wheel 350 freely mounted on the stub shaft 332. A coiled spring 351 is connected at its inner end to the register wheel and is connected at its outer end to the member 349 for urging the toothed wheel 350 in the same direction as the register wheel. A latch lever 352 is normally held by a spring 353 in a position to engage a tooth on the wheel 350 for holding the latter against rotation with the register wheel. Fixed to the shaft 146 is a cam 355 which is operative to disengage the lever 352 from the wheel 350 just after 0 time in each machine cycle. If the register wheel has been turned during the time that the wheel 350 is held, then the abutment portion 348 is moved clockwise to a position ahead of the member 349 (see Fig. 22). As soon as the cam 355 disengages the lever 352 from the wheel 350, the latter is turned by the spring 351 until the member 349 again engages the abutment 348 in a new position (Fig. 23).

Fixed to the wheel 350 are a pair of brushes 357 (Fig. 20) which cooperate with separate contacts 358, numbered 0 to 9 as shown, and a common contact 359. For each tooth that the wheel 350 rotates, the brushes 357 move a distance equal to that from one of the contacts 358 to the second adjacent contact. While one of the brushes 357 engages different contacts 358, the other brush engages the common contact 359. It will be noted that for each rotation of the wheel 350, the common contact 359 is connected successively to the contacts 358 in the order of the numbers 0 to 9.

When the latch lever 344 is released from the spider 340, the register wheel is driven in a clockwise direction in Fig. 18, but the wheel 350 is held stationary during this time by the lever 352. As soon as the latch 344 is engaged again with the spider, the register wheel is stopped, and the abutment 348 is then in a new position to limit rotation of the brushes 357 when the lever 352 is released from the wheel 350. For moving the latch lever 344 out of and into engagement with the spider, there is provided a start magnet 361 and a stop magnet 362 acting upon an armature 363 which is operatively connected to the latch lever 344. At the upper end of the latch lever is a spring urged latch 364 for releasably holding the lever in either its engaged or disengaged position.

The brushes 357 and the contacts 358, 359 form an emitter which has been designated in Fig. 25b as the "storage counter" emitter. The contacts 358 are connected to the corresponding numbered contacts of the continuously running distributor 326, and the contact 359 is adapted to be connected through various relay contacts to the stop magnet 362.

Printing mechanism

Each card 1 (Fig. 25a) bearing data to be read, will have perforations in four columns extending transversely of the card. There will be one perforation in each column at any one of ten index points numbered 0 to 9. The perforations in the units, tens and hundreds columns determine, respectively, the lateral movement of the reading pins 57, the vertical movement of the card packs, and the selection of the group of packs or compartment from which a reading is to be taken. The perforation in the thousands column determines the operation of the storage counter and the movement of the carriage horizontally to position the reading mechanisms over a particular card pack in each compartment. During the sensing of a card pack, readings may be taken from all sixteen of the reading pins 57 in any one reading mechanism, or connections may be made to take readings from a smaller number of pins.

As readings are taken, it is necessary that printing means operate to print the data on a record sheet. It is also desirable that the data on card 1 be read and printed on the same record sheet so that one may know what information was contained at each point of reading. Assuming that the card 1 is punched to indicate the electric power used by a customer, and a reading of a card pack indicates the cost for such power, then both the power consumption and the cost should be printed on a bill.

For printing such data, there is provided for each perforated column on card 1 and for each active pin of a reading device, a print bar 370 (Fig. 17) carrying printing elements 371 which are adapted to be actuated by a hammer 372 to effect printing on a record sheet, not shown, passing over a platen 373. The print bar forms part of a printing mechanism which may be like that disclosed in Patent 1,379,268 granted to C. D. Lake. Connected to the lower end of the bar is a pivoted arm 374 which is urged upwardly by a spring 375. Formed on the bar are notches 376 adapted to be engaged by a pawl 377 for stopping the bar in positions to obtain a printing of numbers 0 to 9, as indicated. The pawl is normally held disengaged from the notches by a latch 378 which may be released by the energizing of a magnet 380. Slidably mounted on a rod 381 adjacent the print bar is a block 382 which is connected to a bell crank 383 having operative engagement with a cam groove 384 in a member 385 connected to a shaft 386. Projecting from the block 382 is an arm 388 carrying a bail 389 which normally engages the lower ends of slots 390 in the print bars for limiting upward movement of the latter.

As the 9 to 0 index points on the card 1 are sensed, the bell crank 383 swings in a clockwise direction to permit the movement of the corresponding numbered printing elements to printing positions. If a perforation is sensed, the pawl 377 is released to stop the print bar. For operating the hammer to engage the printing elements, there is provided a lever 391 having a slot 392 which receives a roller 393 carried by the block 382. Arranged above the lever 391 is another lever 394 acting against a cam surface on the hammer 372 and normally held by a spring against an abutment 395. As the block 382 approaches the upper limit of its travel, the roller 393 acts in an inclined portion of the slot 392 for actuating the lever 391 to effect operation of the hammer through the lever 394.

The shaft 386 is rotatably supported by any suitable means, not shown, and freely mounted upon the shaft is a gear 397 meshing with the gear 132 which is driven by the motor 130. Fixed to one side of the gear 397 is a circular clutch plate 398 having a notch 399 which is adapted to receive a dog 400 pivotally mounted on an arm 402 fixed to the shaft 386. An armature latch 403 is engageable with tail portions on the dog 400 and the arm 402 for holding the dog free of the notch 399 and preventing rotation of the shaft 386. A print clutch magnet 404 is operative when energized to disengage the latch 403 so that the shaft 386 is driven and effects operation of the print bars 370.

Associated with the shaft 386 is a distributor, generally designated 406, including brushes 407 fixed to the shaft and operative to connect a conductor 408 successively to contacts 409 at 9 to 0 times in each print cycle. As shown in Fig. 25c, the contacts 409 are connected to the corresponding numbered sensing pins 66 which are engageable with the cards in the card packs 2 through the openings 12 along the upper edges of the packs. The pins 66 for the sensing devices associated with the 0 and 9 compartments are shown in Fig. 25c, with the card pack of each compartment shown in two sections, each section representing the ten cards at opposite sides of the center plate 4.

The pins 57 which are adapted to sense the card through the openings 10 in columns 1 to 4 at one side of each card pack are shown in Fig. 25c connected by plug wires 410 to print magnets 280 numbered 7 to 10. If it were necessary to read from the pack at more than four points, then additional sensing pins 57 could be connected to print magnets by plug wires. Where the mechanism is used for reading out the amount owed for the consumption of electric power, then there may be different rates applying for the same consumption due to the location of the areas served. In this case, some of the pins 57 of each reading device may read from card columns punched at one rate while other pins of the same device read columns punched at a different rate. The plug wires 410 are then connected only to the pins which read the column punched at the rate applying to the customer whose consumption card is being read.

Card feeding mechanism

As shown in Fig. 25a, the punched cards 1 which determine the operation of the mechanisms described above are advanced under the control of a feed clutch 415 to sensing stations 416 and 417. The feed clutch is similar to the print clutch described above, and includes a gear 418 freely mounted on a shaft 419 to which one of a pair of feed rolls 420 is connected. The gear 418 meshes a gear 421 driven by the motor 130 through any suitable means not shown, and fixed to the gear 418 is a notched plate 422 which is engageable by a dog 423 pivotally mounted on an arm 424 attached to the shaft 419. An armature latch 425 is engageable with tail portions on the dog and the arm 424, and is adapted to be disengaged from the tail portions by a feed clutch magnet 426. Other feed rolls, not shown, may be driven from the shaft 419 through any suitable means for advancing the cards through both of the sensing stations.

The cards 1 are of the ordinary IBM type, each including a plurality of columns with ten index points in each column at which a perforation may be located. The points are representative of numbers 0 to 9, and the cards are fed through the sensing stations with the No. 9 points first. As shown in Fig. 25a, the card 1 is punched in four columns at points numbered 1137, and the operation of the machine will be described later for this particular punching.

The sensing station 416 has a brush 428 adapted to sense the hole in the thousands position and to make contact through the hole with a contact roll 429. Another brush 428A senses an unperforated portion of the card and contacts the roll 429 to stop the machine when the feeding of cards fails for any reason. The sensing of a hole by the brush 428 determines the horizontal shifting of the carriage 36 in a manner which will be described later in connection with the circuit diagram.

The sensing station 417 has four brushes 430 adapted to sense the four perforated columns but only those brushes sensing holes in the units, tens and hundreds positions determine the operation of the card pack reading devices. The sensing of a hole in the units position determines the horizontal movement of the reading pins 57, while the sensing of holes in the tens and hundreds positions determines the vertical movement of the card packs and the selection of the group or compartment from which a reading shall be taken. This will also be described later in connection with the description of circuits. Each of the brushes 430 is adapted to engage a contact roll 431 upon the sensing of a hole, and each is connected by a plug wire 432 to print magnets 380 (Fig. 25c) so that the amount punched into the card 1 may be printed on a record sheet.

Circuits, timing and operation

As shown in the timing diagram (Figs. 24a to 24c), each machine cycle is divided into twenty equal parts or cycle points. The card 1 is advanced so that its 9 to 0 index points come into position for sensing at each of the stations during the first ten points of a cycle. A perforation at the 9 index point is sensed by a brush at approximately 6° in the first cycle point and passes from the brush at about 21°. The other index points pass under the brushes during corresponding portions of the following cycle points.

The forward magnet 292 and the reverse magnet 303 for each of the control units described above may be energized from the sensing brushes for positioning the reading devices. When one of the magnets controlling movement of the carriage is energized, the carriage moves a distance equal to the spacing between adjacent card packs for each cycle point. If one of the magnets controlling vertical movement of the card packs is energized, the card packs are shifted a distance equal to the spacing between the horizontal rows of openings 10 for each cycle point. In a similar manner, the reading pins 57 are shifted a distance equal to the spacing between adjacent vertical rows of openings 10 for each cycle point, and the cam shaft 120 is rotated a distance equal to the angular spacing of the notches 122 in adjacent members 121 for each cycle point.

In describing the operation, it may be assumed that all parts of the card pack reading devices are in their home positions when the machine is started. This means that the reading device for each compartment will be supporting the 0 card pack in each compartment in a position so that its top or 0 row of openings 10 will be in a position to be sensed by the pins 57 which, in turn, are in position to sense the first or 0 vertical row in each group of ten rows. The cam shaft 120 is also in a position to effect an operation of the pins 57 and 66 to sense the card pack only in the 0 compartment.

Connected in the circuits are contacts which are controlled by cams driven by any suitable means, not shown, with other parts of the machine. Some of these contacts designated CB are operated by cams which are driven continuously during operation of the machine. Other contacts designated CF are operated by cams which are driven only during card feed cycles, i. e., cycles during which cards 1 are fed relative to the sensing stations. Another set of contacts designated CT1 are closed by a cam at 300° of every other cycle and are held closed until 270° of the following cycle. A number of relays identified by the letter R are connected in circuits with the cam contacts. Each of these relays has a pick-up coil P, and most of them have a holding coil H. The contacts controlled by the relays are given the same reference characters as the relays followed by a lower case letter. Thus, R1 represents a relay, and R1a, R1b, etc., represent contacts controlled by the relay. To avoid cross wiring, the contacts are located, in many cases, at points remote from the relay, and, in such cases, the relay is shown dotted adjacent the contacts or is shown operatively connected to the contacts by a dotted line.

Referring to Figs. 25a to 25c, it will be noted that the various circuits are connected between conductors 440, 441 which may be connected to any suitable source of power by a switch, not shown. The motor 130 (Fig. 17) may be connected directly between the conductors 440, 441 so that it operates continuously while the circuits of the control devices are energized. The cam contacts CT1 are connected in a circuit extending from the conductor 440 through a conductor 442, the contacts CT1, relay R9 and a conductor 443 to the conductor 441. The relay R9 is, therefore, picked up at 300° every other cycle and is held up until the contacts CT1 open at 270° in the following cycle. A start key 444 is connected at one side to the contacts CT1 and is connected at its other side through the pick up winding of relay R1 to the conductor 443. If the start key is closed at the time that the contacts CT1 close, relay R1 is energized and its contacts R1a close to complete a holding circuit from the conductor 440 through a conductor 445, the normally closed relay contacts R3a and R2b, contacts R1a, and the holding coil of relay R1 to the conductor 443.

The energizing of the relay R1 also results in the closing of contacts R1b to complete a circuit, when cam contacts CB1 are closed, from the conductor 442 through contacts CB1, contacts R7a (normally closed), contacts R12b (normally closed), contacts R9b (now transferred), contacts R1b, and the feed clutch magnet 426 to the conductor 443. This means that the magnet 426 is energized on the closing of the CB1 contacts at 312° and releases the dog 423 of the feed clutch 415. The dog engages the notch in the plate 422 to effect a driving of the card feeding mechanism at 330° in the cycle.

Cam contacts CF7 are closed twice during each card feed cycle, once between 76° and 90°, and again between 346° and 360°. Since the card feed clutch engages at 330°, the contacts CF7 close shortly after that and complete a circuit from the conductor 442 through contacts R6b (normally closed), contacts CF7 and the pick up winding of relay R2 to the conductor 443. Relay contacts R2a are then closed to complete a holding circuit from conductor 445 through cam contacts CF4 and the holding coil of relay R2 to the conductor 443. This holding circuit is maintained until the contacts CF4 open at 280° in the following cycle. With the picking up of the relay R2 at 346° by the cam contacts CF7, the relay contacts R2b are opened to break the holding circuit for relay R1. The contacts R1b are then opened to prevent other pulses from the CB1 contacts reaching the feed clutch magnet 426. The circuit to the magnet had been broken, however, just before the contacts R1b opened, by the opening of the CB1 contacts at 342°.

Engaging the contact roll at the first sensing station 416 is a brush 447 which is connected through normally closed contacts R2c and cam contacts CF1 to the conductor 442. When the relay R2 is picked up at 346°, the contacts R2c open and prevent the energization of the contact roll by pulses from the CF1 contacts. It will be noted in the timing diagrams of Figs. 24a to 24c that the CF1 contacts close during the latter half of each of the 9 to 0 cycle points in the card feed cycles.

A relay R5 (Fig. 25a) has its pick up winding connected in a circuit extending from the conductor 445 through cam contacts CF3, hopper contacts HC and the pick up winding to the conductor 443. As long as cards remain in the feed hopper, the contacts HC are closed and the relay is picked up by the CF3 contacts at 108° in each card feed cycle. An energizing of relay R5 results in a closing of its contacts R5a to establish a holding circuit from the conductor 445 through cam contacts CF4, relay contacts R5a and the holding coil of relay R5 to the conductor 443.

Relay R6 is picked up after relay R5 is energized due to the closing of contacts R5b which are connected in a circuit extending from conductor 442 through contacts R5b and the pick up winding of relay R6 to the conductor 443. Contacts R6a are then closed to establish a holding circuit from the conductor 445 through cam contacts CF5, relay contacts R6a and the hold winding of relay R6 to the conductor 443. It will be noted in the timing diagram that the pick up and holding of relay R5 through the cam contacts CF3 and CF4 overlaps the time during which the cam contacts CF5 are open. After relay R6 has once been picked up, it will remain up due to this overlap in timing, until there is a card feed cycle in which the hopper contacts are not closed and the relay R5 fails to be energized.

The above circuits are established during the first machine cycle when all of the cards 1 to be sensed are in the hopper. The bottom card is fed from the hopper during this cycle and is advanced to but not through the first sensing station. Fig. 26a shows the times during which the various relays are energized in this cycle.

*Cycle 2.*—During this cycle, the start key 444 may be operated again to effect a picking up of relay R1 when the cam contacts CT1 close at 300°. Relay R9 is picked up at the same time, and the contacts R9b and R1b are operated to complete a circuit again from the cam contacts CB1 to the feed clutch magnet. The first card is then advanced through the first sensing station, and a second card is fed from the hopper. As shown in Fig. 26a, the relays R1 and R9 are picked up at 300° in the second cycle, and the feed clutch magnet is energized at 312° when the CB1 contacts close.

Since the relay R6 is being held up, as explained above, the contacts R6b are transferred to prevent an energizing of the relay R2 from the conductor 442 through the cam contacts CF7. The transferred contacts R6b connect the cam contacts CF7, however, to the brush 428A at the first sensing station. When cards are fed through the sensing stations in a normal manner, the brush 428A is held by a card out of engagement with the contact roll 429 while the contacts CF7 are closed. If the card feed fails for some reason, the brush 428A engages the contact roll and completes a circuit through the contacts CF7 and the relay R2. This causes the relay contacts R2b in the holding circuit for relay R1 to open so that the latter is dropped and causes its contacts R1b to open for preventing CB1 pulses from reaching the feed clutch magnet.

When these conditions exist, the machine is stopped. Otherwise, the relay R2 is maintained de-energized and the holding circuit for relay R1 remains closed so that this relay is not dropped.

*Cycle 3.*—As shown in Fig. 26, other relays are energized during Cycle 3. The energizing of some of these relays and the times during which they are energized, depends upon the data sensed in the first card while it is advanced through the sensing station 416 by the energizing of the feed clutch magnet in Cycle 2.

It was assumed above that the first card would be punched for the number 1137, and that the various parts of the reading devices would be in their home positions. The emitters for the various control units of the feed devices would then be in positions with their brushes engaging to 0 contacts, as shown in Fig. 25b.

The brush 428 aligned with the index points in the thousands order position on card 1 is connected by a plug wire 450 to the pick up winding of relay R10 and to the start magnet 361 (Fig. 25b) of the storage counter. The other end of the pick up winding is connected through the conductor 443 to the power conductor 441, and the other end of the start magnet is connected through a conductor 451 to the power conductor 441. Since the brush 428 will sense a perforation at the No. 1 index point in the card, relay R10 will be picked up at 153° in Cycle 3 as shown by Fig. 26. The start magnet will be energized at the same time to release the latch lever 344 (Fig. 18) and effect a driving of the register wheel 338 to advance the abutment member 348 (Fig. 21). The brushes 357 for the storage counter will continue engaging the 0 contact, however, until the latch lever 352 is operated to effect a release of the brushes at 216°.

At "0" time (171° in the cycle), the continuously driven cam contacts CB8 (Fig. 25b) close and complete a circuit from the conductor 440 through contacts R9h (transferred), R8e (normally closed), R1d (now closed) and the stop magnet 362 to the conductor 451. The energizing of the stop magnet re-engages the latch lever 344 of the storage counter with the spider 340 to stop the driving of the register wheel. The abutment member 348 is then only one step in advance of the brushes 357 and limits the movement of the brushes to engage the No. 1 contact 358 when the latch lever 352 is operated.

When relay R10 is picked up by the sensing of a perforation at the No. 1 index point, relay contacts R10a close and complete a holding circuit from the conductor 442 through the cam contacts CF6, contacts R10a and the hold winding of relay R10 to the conductor 443. At the same time, relay contacts R10b are transferred to connect relay R12 in a circuit with cam contacts CF2. As noted in the timing diagram, cam contacts CF2 are closed during the first half of each cycle point following the sensing of an index point on card 1. Since the contacts of relay R10 were first closed at 153°, the closing of cam contacts CF2 at 162° will cause a pulse to pass from conductor 442 through contacts CF2, R10b (transferred), R11b (normally closed) and the pick up winding of relay R12 to the conductor 443. Relay R12 is of the latch type and remains up until its trip winding T is energized.

At "0" time (171° in the cycle), a circuit is completed to energize the pick up winding of relay R11. This circuit extends from the conductor 440 (Fig. 25b) through the brush 327 of the continually running distributor 326 to the 0 contact 325, the 0 contact of the carriage emitter, terminal 316, relay contacts R7b (normally closed), R9d (now closed), R2d (normally closed), R6c (now closed) and the pick up winding of relay R11 to the conductor 443. This causes the relay contacts R11a to close and complete a holding circuit from the conductor 442 through the cam contacts CF6, relay contacts R11a and the hold winding of relay R11 to the conductor 443. At the same time, relay contact R11b transfers and prevents further pulses reaching the relay R12 from the cam contacts CF2.

As shown in Fig. 25a, the opposite contacts of R10b and R11b are connected so that a pulse will pass from the contacts CF2 to the relay R12 only when the contact elements of R10b and R11b are in opposite positions. If the contact elements are in these positions, then the hole in the card must be at a location which differs from the setting of the carriage. If the carriage had originally been positioned to locate the reading devices over the No. 1 card pack instead of the No. 0 pack, then the brush for the carriage emitter would have been on the No. 1 contact and the circuit from the distributor 326 through the emitter to relay R11 would have been completed at 1 time instead of 0 time. This would have caused contacts R11b to transfer at the same time that contacts R10b transferred and the relay R12 would not have been energized.

Up to this time in the third cycle, the relay R12 was picked up because the reading of the card was different from the setting of the carriage emitter, and the storage counter was advanced one step by the energizing of the start magnet at 1 time on the sensing of the hole in the card and the energizing of the stop magnet at 0 time through the cam contacts CB8.

At 205° in this cycle, the first card closes card lever contacts 453 (Fig. 25a) so that the closing of cam contacts CB3 at 348° completes a circuit from the conductor 442 through contacts CB3, card lever contacts 453 and the pick up winding of relay R4 to the conductor 453. Relay contacts R4a close and establish a holding circuit from conductor 445 through cam contacts CB7, relay contacts R4a and the hold winding of relay R4 to the conductor 443. As shown in the timing diagram, the closing of contacts CB3 overlaps the opening of contacts CB7 so that relay R4 is held up until 357° of the cycle in which the last card passes the card lever contacts.

*Cycle 4.*—At the end of Cycle 3, the first card has passed through the sensing station 416 and the second card has been advanced to a point just in front of this station. The card feed clutch latches up at this time and the cards remain where they are until another pulse is delivered to the feed clutch magnet. Since relay R12 was picked up during Cycle 3 and is held up through Cycle 4, as shown in Fig. 26, then the feed clutch magnet cannot be pulsed from CB1 when relay R9 is picked up in Cycle 4 by the closing of cam contacts CT1. It will be noted that contacts R12b in the circuit with the clutch magnet will be open at that time.

Connected in a circuit with the cam contacts CB3 are relay contacts R12a, R9a and the pick up winding of relay R7. The contacts R12a are closed during all of Cycle 4, and the contacts R9a are closed at 300° of this cycle. The cam contacts CB3 close at 348° of this cycle and complete the circuit through relay R7. This relay is of the latch type and remains up until its trip winding is energized.

*Cycle 5.*—During the time that the brush of the continually running distributor 326 (Fig. 25b) moves across its contacts 325 in Cycle 5, the relays R4 and R9 are both energized. When the brush engages the 0 contact, a circuit is completed from the conductor 440 through the distributor, the 0 contact of the vertical emitter, relay contacts R9g (now closed), relay contacts R4g (now closed) and the reverse magnet 303v of the vertical control unit to the conductor 451. This causes the latch lever 287a (Fig. 4) to be released so that the differential gear 306 is driven in a direction to effect an operation of the vertical transmission device 153 for lowering the card packs from their reading positions in which they were assumed to be supported.

As described above, each of the drums for the transmission devices has a projection 294 (Fig. 4) for knocking off the latch levers of the control units at predetermined times. Each of the drums for the vertical transmission device has two of these projections operating at 243° and 351°, respectively, for knocking off the latch levers of its control unit. Since the vertical reverse magnet was energized at 0 time (171°), the card packs will be lowered until the latch lever of the control unit is knocked off at 243°. There are four cycle points between the 0 time and 243°, therefore, the card packs are lowered four steps where they rest at their lower ends on bars 22 (Fig. 10) and the notches 50 in the end members of the card supporting frame are in line with the same notches of the other frames for the card packs. It will be seen that the carriage may then be moved horizontally to position the reading devices in line with any card pack of their respective compartments.

Since relay R7 was picked up at the end of Cycle 4 and is latched up during Cycle 5, a circuit is completed on the closing of the cam contacts CB1 in this cycle to energize relay R8. This circuit extends from conductor 442 through contacts CB1, contacts R7a (transferred) and the pick up winding of relay R8 to the conductor 443. Contacts R8a close and complete a holding circuit from conductor 445 through cam contacts CB6, contacts R8a and the hold winding of relay R8 to the conductor 443. This circuit is maintained until the cam contacts CB6 open at 300° of the next cycle.

*Cycle 6.*—As described above under operations for Cycle 3, the storage counter was advanced one step by the sensing of a 1 hole in the card. The brush for the storage emitter was held up when the counter was advanced, but the brush was released before the end of the cycle so that it took the setting of the counter.

When the cam contacts CB5 (Fig. 25b) close at the end of Cycle 5, a circuit is completed from the conductor 440 through the contacts CB5, relay contacts R1c (now closed), R8d (now closed), R9c (normally closed) and the start magnet 361 to the conductor 451. The storage counter is then advanced from "9" time at the beginning of Cycle 6 until "1" time when the storage counter is stopped by an impulse to the stop magnet. The register wheel 338 of the counter is thus rotated nine steps and comes to rest at its zero position. The brush 357 is held, however, on the No. 1 contact so that a circuit is completed, when the distributor reaches its No. 1 contact, from the conductor 440 through the distributor, the No. 1 contact on the emitter of the storage counter, relay contacts R8f (now transferred), R8e (now transferred), R1d (now closed) and the stop magnet 362 to the conductor 451.

At the same time that the circuit is completed to the stop magnet, a parallel circuit is completed from the relay contacts R8f to the forward magnet 292c for the carriage control unit. The latch lever 287 (Fig. 6) for the control unit of the transmission device 152 is thus released at "1" time so that the carriage is moved horizontally in a forward direction. At "0" time, the projection 294 (Fig. 4) on the drum 156 of the transmission device knocks off the latch lever 287 to stop the driving of the carriage. It will be seen that the carriage is moved forward one step so that the reading devices are in line with the No. 1 card packs in the different compartments.

The forward magnet 292v (Fig. 25b) for the vertical control unit is then energized at 279° by a circuit extending from the conductor 445 (Fig. 25a) through cam contacts CB4, a conductor 455, relay contacts R8c (now closed) and the forward magnet 292v to the conductor 451. This causes the transmission device 153 to drive the racks 45 (Fig. 10) so as to lift the No. 1 card packs. As mentioned above, the latch levers for the control unit of this transmission device are knocked off at 351° to stop the lifting of the card packs. Between the energizing of the start magnet at 279° and the knocking off of the latch levers at 351°, four cycle points of machine operation take place so that the No. 1 card packs are then supported in their "0" reading positions.

Other circuits are completed on the closing of the cam contacts CB4 to energize the trip windings of relays R7 and R12. These circuits extend from the conductor 445 through the contacts CB4, relay contacts R8b (now closed), and branch conductors to the trip windings T and the conductor 443. With the contacts of relays R7 and R12 assuming their normal positions, circuits may be established for feeding cards once more.

*Cycle 7.*—The cam contacts CT1 close again at 300° in Cycle 6 and transfer its contacts R9b so that a circuit is completed on the closing of the contacts CB1 at 312° to energize the feed clutch magnet for advancing the first card through the second reading station while the second card is advanced through the first station. A third card is advanced at the same time from the feed hopper.

The print clutch magnet 404 (Figs. 17 and 25a) is also energized for the first time on the closing of the cam contacts CB1 since this is the first time that the contacts for relays R7, R12 are in their normal positions and the contacts R4b are closed. With the print clutch magnet energized, the type bar 370 moves upwardly in synchronism with the sensing of index points in the first card at the second reading station. The print cycle distributor 406 is also driven at this time but there is no reading of the card packs since the reading pins 57 and 66 are not moved into engagement with the cards during this cycle.

As the brushes 430 sense the holes at the 1137 index points of the first card, the magnets 380 in the Nos. 1 to 4 positions are energized through the plugwires 432 to stop their associated print bars in corresponding positions. At the end of the print cycle, the hammers 372 are actuated to force the type elements into engagement with the record sheet for printing the number 1137.

The brushes 430 in the units, tens and hundreds positions at the second reading station are connected by plug wires 457, 458 and 459, respectively, to the forward magnet 292h of the horizontal control unit, the forward magnet 292v of the vertical control unit, and the forward magnet 292g of the group control unit. As the brushes engage the card at each of its index points, the cam contacts CF1 close to apply a voltage from the conductor 442 through relay contacts R4c to a brush 460 engaging the contact roll 431.

Upon the sensing of the hole at the No. 7 point in the units column, a circuit is completed from the brush 430 through the plugwire 457 to the forward magnet 292h of the horizontal control unit. The transmission device 151 then shifts the members 54 (Fig. 11) longitudinally until "0" time when the latch lever for its control unit is knocked off by its drum projection 294. This movement of the members 54 shifts the sensing pins 57 from 0 reading positions to positions in which they read the No. 7 vertical rows of openings 10 in each field of the card packs.

At "3" time, the brush 430 in the tens position senses a hole and completes a circuit through the plugwire 458 to the forward magnet 292v of the vertical control unit. The transmission device 153 then operates to lift the card packs until "0" time when a circuit is completed from the continuously running distributor 326 through the 0 contact of the vertical emitter, relay contacts R9g (now closed), contacts R4g (now closed) and the reverse magnet 303v to the conductor 451. The control unit then drives the vertical reverse mechanism and cancels out further forward drive from the mechanism. At 243° both forward and reverse motions are arrested by mechanical knock-off of the latch levers. The card packs are all supported after this operation in positions to receive the sensing pins 66 within the openings 12 at the top of the card packs and to receive the pins 57 within the openings 10 in the No. 3 horizontal row, this being the fourth row of openings.

At "1" time, the brush 430 in the hundreds position senses a hole at the No. 1 index point and completes a circuit through the conductor 459 to the forward magnet 292g in the control unit for the transmission device 150. The cam shaft 120 (Fig. 11) is then rotated until "0" time when the mechanical knock-off relatches the control unit and stops the driving by the transmission device. The shaft 120 will have rotated one step so that only the cam 121 at the No. 1 compartment will be in position to effect a movement of reading pins into engagement with a card pack.

It will be noted that the "Group" and "Horizontal" emitters have their brushes in engagement with the "0" contacts during the sensing of the card at the second station. At "0" time, circuits are completed from the distributor 326 through these emitters to the reverse magnets, but this is ineffective because the mechanical knock-offs operate at "0" time to prevent a release of the reverse latch levers as well as a relatching of the forward latch levers.

The machine is now adjusted to read from the No. 7 points of each field in the No. 3 horizontal row of the No. 1 card pack in compartment No. 1. This is the setting that corresponds to the punching of 1137 in the first card.

While the first card is being sensed at the second station, the column in the thousands position on the second card is being sensed at the first station. Assuming that a hole is punched at the No. 1 index point in this position, then a pulse is delivered from the brush 428 at No. 1 time to pick up the relay R10. Since the carriage is now in the No. 1 position, the brush for the carriage emitter is also in its No. 1 position and a circuit is completed from the distributor 326 through the carriage emitter to the pick up winding of relay R11 at "1" time. This circuit is the same as that described above under Cycle 3. With the relays R10 and R11 energized at the same time, contacts R10b and R11b will be in opposite positions and no circuit will be completed to energize relay R12. The "1" read by brush 428 will be entered in the storage counter in the same manner as described above.

*Cycle 8.*—This is a cycle in which there is no operation of the contacts CY1 to energize the relay R9, and the contacts R9b are, therefore, in a position to prevent the energizing of the feed clutch magnet. Since relay R12 was not picked up in Cycle 7, then relay R7 must also be de-energized. The contacts R7a and R12b of these relays are in their normal positions to complete a circuit, upon the closing of contacts CB1, through contacts R4b (now closed) to the print clutch magnet. The print bars are moved upwardly and the distributor 406 (Figs. 17 and 25c) is operated to deliver pulses to the pins 66 of the reading devices for the card pack.

The pins 57 and 66 for the reading device associated with compartment No. 1 are moved to sensing positions during this cycle. As described above, the No. 1 card pack is supported so that the pins 66 enter its openings 12 and the pins 57 enter the openings 10 in the No. 3 horizontal row and located at the No. 7 points in each field. The pins 57 located in fields 1 to 4 are shown in Fig. 25c connected by plugwires 410 to print magnets 380 numbered 7 to 10. If the pin 57 in the No. 1 field extends through the opening 10 to engage the No. 5 card, then a circuit is completed at "5" time from the distributor 406 through the pin 66 in the No. 5 position, the No. 5 card in the pack, the pin 57 in the No. 1 field, plugwire 410 and the print magnet 380 in the No. 7 position. The pins 57 in the 2, 3 and 4 fields may be contacting any one of the 0 to 9 cards in the pack. Circuits are completed through these pins to their print magnets when the distributor delivers pulses to the pins 66 engaging the corresponding numbered cards in the pack.

As described above under Cycle 7, a "1" was registered in the storage counter on the reading of a 1-hole at the thousands position in card No. 2. This value is cleared from the counter in Cycle 8 by delivering a pulse from contacts CB5 at 351° in Cycle 7 to the start magnet of the counter. The counter is advanced from "9" time in Cycle 8 until a pulse is delivered to the stop magnet at "1" time. The circuit to the start magnet is like that described in Cycle 6, but the circuit to the stop magnet extends from the distributor 326 through its No. 1 contact to the No. 1 contact of the storage counter, contacts R8f (normally closed), contacts R12d (normally closed), contacts R9h (normally closed), contacts R8e (normally closed), contacts R1d (now closed) and the stop magnet 362 to the conductor 451.

*Cycle 9.*—During the latter part of Cycle 8, the feed clutch magnet is energized to advance card No. 2 through the second sensing station while card No. 3 is advanced through the first station. If there were other cards in the hopper, then the fourth card would be fed at this time. It will be assumed that there were only three cards in the hopper when starting so that it is now empty. The print clutch magnet is energized again to effect an operation of the print bars while card No. 2 is being sensed. A sensing of holes in card 2 results in the energizing of print magnets 380 numbered 1 to 4 for positioning the print bars to obtain a printing of the data punched in the card.

In order that additional functions of the machine may be described, it will be assumed that the hundreds, tens and units positions of card No. 2 are punched at the 6, 5 and 1 index points. It has already been assumed that the thousands position is punched at the No. 1 index point.

Due to the sensing of 1, 3, 7 in the hundreds, tens and units positions of card No. 1, the control units and brushes for the "Group," "Vertical" and "Horizontal" emitters are in their 1, 3 and 7 positions, respectively. At "7" time in Cycle 9, a circuit is completed from the distributor 326 through the 7 point of the "Horizontal" emitter, contacts R7d (normally closed), contacts R9f (now closed), contacts R4f (now closed) and the reverse magnet 303h to the conductor 451. At "1" time in this cycle, the brush 430 in units position senses the No. 1 hole in card 2 and completes a circuit to the forward magnet 292h in the horizontal control unit. Up to this time, the horizontal control unit had been moved back six steps from the No. 7 position and is in its No. 1 position. The energizing of the forward magnet causes further operation from the energized reverse magnet to be cancelled out. At zero time, both the forward and reverse latch levers for the control unit are relatched by the mechanical knockoffs. The brush for the "Horizontal" emitter is moved directly to its No. 1 position during reverse drive due to engagement of the arm 308 (Fig. 2) with the stud 309.

The forward magnet 292v of the vertical control unit is energized at "5" time by the sensing of the hole in tens position. At "3" time, the reverse magnet 303v is energized from the distributor 326 through the No. 3 contact on the vertical emitter. A forward drive is obtained from "5" time until "3" time when it is cancelled out by the energizing of the reverse magnet. The card packs are, therefore, lifted to their No. 5 positions. Both the forward and reverse drives are stopped at "0" time by their mechanical knockoffs. Shortly after zero time, the dog 319 (Fig. 2) is operated by the stud 321 to release the brush 312 so that it takes the new position of the control unit.

In a similar manner, the forward magnet 292g of the "Group" control unit is energized at "6" time, and its reverse magnet is energized at "1" time. The shaft 120 (Fig. 11) is, therefore, moved ahead five steps so that the reading device at compartment No. 6 will be actuated to read its card pack.

In order that it may be understood how the carriage is shifted during operation of the machine, it will be assumed that the third card is punched for the number 0520. The carriage is in its No. 1 position during Cycle 9 due to the sensing of a 1 in the thousands position of card No. 2. Since card No. 3 has a hole at its No. 0 index point in the thousands position, then a shift in the carriage is indicated. At "1" time, relay R11 is picked up through the carriage emitter. Relay R10 is not picked up until "0" time by the sensing of card No. 3 at the first station. Relay contacts R10b and R11b, therefore, are in opposite positions so that a circuit is completed at 162° when cam contacts CF2 close to energize relay R12. Relay R10 picks up at "0" time (171°), but relay R12 is then latched up.

The pulse at "0" time from the sensing of card No. 3 is delivered also to the "start" magnet of the storage counter, but another pulse is delivered at the same time from CB8 to the stop magnet so that there is no shifting of the storage counter from its 0 position.

The hopper contacts HC opened at 218° in Cycle 7 when card No. 3 was fed from the hopper and prevented relay R5 from picking up again after it was de-energized at 280° in Cycle 7 by the opening of cam contacts CF4. The pick up winding of relay R6 cannot be energized again since relay contacts R5b are open after 280° in Cycle 7, but relay R6 is being held up at the end of Cycle 7 through cam contacts CF5 and, since these contacts are operated only during card feed cycles, they will not be opened until 225° in Cycle 9.

*Cycle 10.*—When the cam contacts CB1 close at 312° in Cycle 9, a circuit is completed through relay contacts R7a (normally closed), contacts R9b (normally closed), contacts R4b (now closed) and the print clutch magnet 404. This causes a reading, as described under Cycle 8, of card pack No. 1 by a reading device which was adjusted as described in Cycle 9. The data read from the pack will be that which corresponds to the sensing of 1651 in the second card advanced through the sensing stations.

The feed clutch magnet and the print clutch magnet are not energized at the end of Cycle 10 because the contacts R12b are open.

Relay R7 is picked up on the closing of cam contacts CB3 at 348° in Cycle 10 because relay contacts R12a and R9a are both closed at this time.

*Cycle 11.*—The reverse magnet 303v for the vertical control unit is energized at 81° (5-time) in Cycle 11 due to the fact that the brush for the vertical emitter is on its No. 5 contact because of the sensing of a 5-hole in the tens position on card No. 2. The energizing circuit extends from the distributor 326 through the No. 5 contact of the vertical emitter, contacts R9g (now closed), contact R4g (now closed) and the reverse magnet to the conductor 451. The transmission device 153 then operates to lower the card packs until the mechanical knockoff operates at 243° (14-time) to relatch the control unit and stop the drive. The card packs are then four steps below their 0 positions and rest on the bottoms of the compartments.

Relay R8 picks up when cam contacts CB1 close at 312° in Cycle 11 because the contacts R7a are now transferred. This makes it possible to energize the start magnet of the storage counter when the cam contacts CB5 close at 351°.

*Cycle 12.*—Due to the pulse received by the start magnet of the storage counter at 351° in Cycle 11, this counter is driven in a forward direction from "9" time in Cycle 12 until "0" time when the stop magnet is pulsed through a circuit extending from the distributor 326 through the 0 contact of the emitter for the storage counter. This merely restores the counter to its 0 position again.

The carriage is in its No. 1 position at this time due to the sensing of card No. 2, and the brush for the carriage emitter is engaging its No. 1 contact so that a circuit is completed at "1" time from the distributor to the reverse magnet 303c of the control unit for the carriage. When the circuit was completed at "0" time to the stop magnet of the storage counter, a branch circuit was completed to the forward magnet of the carriage control unit. It will be seen that the carriage is moved in a reverse direction one step to its 0 position when the forward magnet is energized and cancels out any further reverse drive. The mechanical knockoff operates at "0" time, however, and prevents either forward or reverse drive.

The forward magnet of the vertical control unit is energized at 279° in Cycle 12 by the closing of cam contacts CB4 (Fig. 25a). This causes the card packs at the 0 positions in the compartments to be lifted until the mechanical knockoff operates, as described in Cycle 6, at 351° to stop the card packs in 0-position. The closing of the cam contacts CB4 also results in the energizing of the trip magnets in relays R7 and R12 to effect an opening of their contacts.

Relay R8 is dropped at 300° in Cycle 12 when the cam contacts CB6 open.

Since relay R6 was de-energized at 225° in Cycle 9, its contacts R6b are in their normal position, as shown in Fig. 25a, and the relay R2 is energized through the cam contacts CF7 on the following card feed cycle. At 312° in Cycle 12, the feed clutch magnet 426 and the print clutch magnet 404 are energized again to start a card feed cycle. Just after engagement of these clutches, at 346°, the cam contacts CF7 close and cause relay R2 to be picked up. This opens the contacts R2b in the hold circuit for relay R1 so that the latter is dropped at 346° in Cycle 12.

*Cycle 13.*—During this cycle, card No. 3 is advanced through the second sensing station, and the reading of the card causes the print magnets 1 to 4 to be energized so as to effect a printing of the number 0520 which was punched in the card.

Due to the sensing of the hole at the No. 1 index point in units position on card No. 2, the horizontal control unit is in its No. 1 position. This causes the reverse magnet 303h to be energized from the distributor 326 through the horizontal emitter at "1" time. The forward magnet 292h is energized at "0" from the sensing of the hole at the 0 index point on card No. 3 and would cause any further reverse drive to be cancelled out if it were not for the fact that both the forward and reverse drives are stopped by the mechanical knockoff at "0" time.

The vertical control unit is in its "0" position at the beginning of Cycle 13, because it was moved to that position in Cycle 12 as explained above. At "2" time (135°), the forward magnet 292v is energized from the sensing of a hole at No. 2 point in the tens position of card No. 3. The card packs are then lifted two steps until "0" time when the mechanical knockoff stops the drive from the transmission device 153.

The control unit for determining which group of card packs should be read from is in its No. 6 position due to the sensing of the hole at the No. 6 index point in the hundreds position on card No. 2. This results in an energizing of the reverse magnet 303g at "6" time. The forward magnet 292g of the group control unit is energized at "5" time by the sensing of a hole at the No. 5 point in the hundreds position on card No. 3. This cancels out further reverse drive until "0" time when both forward and reverse drives are stopped by the mechanical knockoff. A shifting of the cams 121 is obtained by this operation to make the reading device for compartment No. 5 effective.

*Cycle 14.*—The last card in the machine, card No. 3, was fed through the second sensing station during Cycle 13, and the sensing devices were adjusted to read data from a card pack corresponding to the number 0520 which was punched in the card. At 312° in Cycle 13, the print clutch is energized again by a pulse from the CB1 contacts and the reading pins are engaged with the card pack during Cycle 14 to effect a reading of the data stored.

The card lever contacts open at 121° in Cycle 13 so that relay R4 is dropped at 357° when the cam contacts CB7 open. The print clutch magnet cannot be energized again after Cycle 13 since the relay contacts R4b are now open. Relay R1 was dropped at the end of Cycle 12 and its contacts R1b opened to prevent further energizing of the feed clutch magnet. The machine now comes to rest until more cards are placed in the hopper and the start key is closed again.

If it is desired to stop the machine at any time while cards remain in the hopper, a stop key 465 (Fig. 25a) may be operated to effect an energizing of relay R3 from cam contacts CB2. This causes contacts R3a in the hold circuit of relay R1 to open. Contacts R1b in the circuit with the feed clutch magnet then open and prevent further feeding of cards.

I claim:

1. A differential control mechanism comprising, in combination, a pair of driving elements rotating freely in opposite directions on a common shaft, rotatable members, one associated with each of said driving elements, clutch mechanisms, one for controlling the driving of each of said rotatable members by the driving element with which it is associated, oppositely facing gear portions on said rotatable members, a stem fixed to said shaft and extending transversely thereof at a point between said gear portions, pinion gears mounted upon said stem at its opposite ends and meshing with both of said gear portions, said pinion gears causing said stem to move angularly about the axes of said rotatable members upon relative rotation of said gear portions and effect a rotation of said shaft, a control gear fixed to said stem for angular movement therewith, electrically actuated clutch-engaging devices for said clutch mechanisms, means for controlling the energizing of one of said devices and means operatively connected to said shaft for controlling the energizing of the other of said devices.

2. The mechanism of claim 1 in which said last mentioned means comprises a contact member freely mounted upon said shaft, a plurality of contacts selectively engageable by said contact member, means for yieldingly urging said contact member to the same angular position as said shaft, means for releasably holding said contact member against movement with said shaft, means for releasing said releasable means from said contact member during predetermined intervals, and means for connecting said contact member electrically to one of said clutch engaging devices.

3. The mechanism of claim 1 in which said last mentioned means comprises a ratchet member freely mounted upon said shaft, a contact member fixed to said ratchet member, a plurality of contacts selectively engageable by said contact member, a stop fixed to said shaft for limiting rotation of said ratchet member in one direction, means for yieldingly urging said ratchet member toward engagement with said stop, a dog for holding said ratchet member against rotation by said yielding means, means for disengaging said dog from said ratchet member at predetermined times, means for connecting said contact member electrically to one of said clutch engaging devices, and means for delivering voltage pulses successively to said plurality of contacts.

4. The mechanism of claim 1 in which said means for energizing one of said devices comprises a contact member freely mounted upon said shaft, a plurality of contacts selectively engageable by said contact member, means for yieldingly urging said contact member to the same angular position as said shaft, means for releasably holding said contact member against movement with said shaft during predetermined intervals, means for connecting said contact member to said one of said devices, means for delivering voltage pulses successively to said plurality of contacts during each of said intervals, and means operable at the end of each of said intervals for disengaging said clutch mechanisms.

5. The mechanism of claim 4 including means for effecting the energizing of the other of said clutch engaging devices at a time during each of said intervals representative of a numeric value.

6. A control mechanism adapted to produce a control function proportional to the difference between values read from cards during successive cycles comprising, in combination, a pair of driving elements rotating continuously in opposite directions, rotatable members, one associated with each of said driving elements, clutch mechanisms, one for controlling the driving of each of said rotatable members by the driving element with which it is associated, annular gear portions on said rotatable members, a control element carrying pinion gears meshing with both of said annular gear portions, said control element rotating in one direction or the other when only one of said clutch mechanisms is engaged and remaining stationary when both of said clutch mechanisms are engaged, electrically actuated clutch engaging devices for said clutch mechanisms, means for sensing data on cards representative of values 0 to 9, means for energizing one of said clutch engaging devices at a time corresponding to the numerical value sensed on a card, and means operatively connected to said control element for controlling the energizing of the other of said clutch engaging devices, said last mentioned means operating to effect the energizing of the device associated therewith at a time dependent upon the position of said control element.

7. A control mechanism adapted to produce a control function proportional to the difference between values read from a record during successive cycles comprising, in combination, a pair of driving elements operating continuously in opposite directions, driven members, one associated with each of said driving elements, clutch mechanisms, one for controlling the driving of each of said driven members by the driving element with which it is associated, a control element, means operatively connecting said control element to said driven members to be driven thereby a distance proportional to the relative movement between said driven members, the direction in which said control element is driven also being determined by the direction of relative movement between said driven members, clutch engaging devices for said clutch mechanisms, means for cyclically sensing data on said record representative of values 0 to 9, means for actuating one of said clutch engaging devices at a time corresponding to the numerical value sensed on said record, means operatively connected to said control element for actuating the other of said clutch engaging devices at a time during each cycle corresponding to the position of said control element, and means operable at a predetermined point in each cycle for disengaging said clutch mechanisms if the latter have been previously engaged.

References Cited in the file of this patent

UNITED STATES PATENTS

| 1,310,781 | Bryce | July 22, 1919 |
| 1,889,419 | Pudelko | Nov. 29, 1932 |
| 1,926,878 | McFall | Sept. 12, 1933 |